(12) United States Patent
Chockalingam et al.

(10) Patent No.: US 8,605,808 B2
(45) Date of Patent: Dec. 10, 2013

(54) METHOD TO DETECT DATA TRANSMITTED BY MULTIPLE ANTENNAS

(75) Inventors: Ananthanarayanan Chockalingam, Bangalore (IN); Balaji Sundar Rajan, Bangalore (IN); Saif Khan Mohammed, Bangalore (IN)

(73) Assignee: Indian Institute of Science, Bangalore (IN)

( * ) Notice: Subject to any disclaimer, the term of this patent is extended or adjusted under 35 U.S.C. 154(b) by 439 days.

(21) Appl. No.: 12/672,273

(22) PCT Filed: Feb. 25, 2009

(86) PCT No.: PCT/IN2009/000125
§ 371 (c)(1),
(2), (4) Date: Feb. 4, 2010

(87) PCT Pub. No.: WO2009/113105
PCT Pub. Date: Sep. 17, 2009

(65) Prior Publication Data
US 2011/0069746 A1    Mar. 24, 2011

(30) Foreign Application Priority Data
Feb. 29, 2008  (IN) .......................... 00514/CHE/2008

(51) Int. Cl.
*H04B 7/02*    (2006.01)

(52) U.S. Cl.
USPC .............. 375/267; 370/334; 700/53; 701/470

(58) Field of Classification Search
None
See application file for complete search history.

(56) References Cited

PUBLICATIONS

PCT International Search Report and Written Opinion, PCT Application No. PCT/IN2009/000125, Sep. 11, 2009, 6 pages.

*Primary Examiner* — Adolf Dsouza
(74) *Attorney, Agent, or Firm* — Fenwick & West LLP

(57) ABSTRACT

Disclosed is a method and system to detect data transmitted by multiple transmit antennas. The method comprises selecting a starting data block that is either a random data block or an output data block from known detectors. Also, the method comprises changing each symbol of the starting data block one symbol at a time to identify a data block which has minimum euclidean distance from the starting data block as detected data block. Next, changing two symbols of the detected data block at a time to identify a data block which has minimum euclidean distance from the starting data block as second data block and assigning the second data block as the starting data block. Repeating the above steps, if the minimum euclidean distance of second data block is better than that of the detected data block, and determining the detected data block as the data transmitted.

20 Claims, 22 Drawing Sheets

Figure 18 (As Previously Presented)

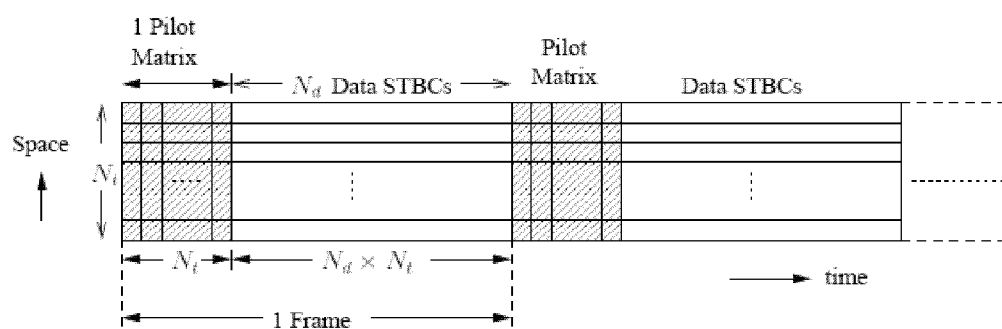
Figure 22 (As Previously Presented)

METHOD TO DETECT DATA TRANSMITTED BY MULTIPLE ANTENNAS

TECHNICAL FIELD

The present invention relates to a system and multistage signal detection method for large multiple-input-output communication systems. Instant discloser deals with a detection technique to determine the data transmitted.

BACKGROUND OF THE INVENTION AND PRIOR ART

Wireless communication systems using 2 or 3 antennas at the transmitter and one antenna at the receiver have been defined in the current standards. Systems using 4 to 8 antennas at the transmitter and 4 to 8 antennas at the receiver are being considered for standardization. Also, the maximum spectral efficiency reported to have been achieved in practical/prototype systems so far is often less than 10 bps/Hz.

Multiple-input multiple-output (MIMO) techniques have become popular in realizing transmit diversity and high data rates through the use of multiple transmit antennas in wireless communication terminals, references [1]-[6]. We consider large MIMO systems having tens of transmit and receive antennas in each communication terminal, which are of interest due to the high spectral efficiencies (of the order of tens to hundreds of bps/Hz) possible in such systems. The key challenges in realizing such large MIMO systems include low-complexity detection, channel estimation, RF/IF technologies and communication terminal size to accommodate large number of antennas. There can be several large MIMO applications where lacing of large number of antennas need not be a major issue. An example of such an scenario is to provide high-speed backbone connectivity between base stations using large MIMO links, where large number of antennas can be placed at the backbone base stations.

The state-of-the art MIMO systems do not achieve the full potential of MIMO communications. Exploitation of large number of communication dimensions (e.g., large number of space dimensions in the case of V-BLAST multi-antenna systems, and large number of space and time dimensions in the case of Space-Time Coded multi-antenna systems) is essential in order to fully reap the MIMO potential. The issue with using large number of antennas is the very high detection complexities involved. For example, optimum ML detection of MIMO signals require complexities exponential in number of antennas, which are prohibitive even for tens of antennas. Even other detectors in the literature which attempt to achieve near-ML performance have complexities cubic or more in number of antennas, which are still prohibitive for tens and hundreds of antennas.

This disclosure addresses the issue of low-complexity detection in large MIMO systems. Recent approaches to low-complexity multi-user detection and MIMO detection involve application of techniques from belief propagation as in reference [7], neural networks in references [8], [9], [10], Markov Chain Monte-Carlo methods in references [11], [12], and probabilistic data association in references [13], [14], to name a few. Detectors based on these techniques have been shown to achieve an average per-bit complexity that is linear in number of users, while achieving near-ML performance in large multi-user CDMA system settings as in reference [8], [9], [14]. These powerful techniques are increasingly being adopted in MIMO detection. Recently, in reference [9],[10], the present disclosure presents a powerful Hopfield neural network based likelihood ascent search (LAS) algorithm for low-complexity large MIMO detection, where we showed that, in large MIMO systems having hundreds of antennas, the LAS detector achieves i) an uncoded bit error rate (BER) performance which is almost the same as the AWGN-only SISO (i.e., no fading) performance given by $Q(\sqrt{SNR})$; this excellent performance is achieved with an average per-symbol complexity of just $O(N_tN_r)$, and ii) a coded BER performance close to within 4.7 dB of the theoretical MIMO capacity using hard decision outputs from the LAS algorithm as input to the turbo decoder.

A limitation with the LAS algorithm disclosed in reference [9], [10] is that it achieves near-maximum likelihood (ML) performance only with hundreds of antennas. Placing hundreds of antennas can be difficult in communication terminals that have space constraints.

REFERENCES

[1] A. Paulraj, R. Nabar, and D. Gore, Introduction to Space-Time Wireless Communications, Cambridge University Press, 2003.

[2] H. Jafarkhani, Space-Time Coding: Theory and Practice, Cambridge University Press, 2005.

[3] D. Tse and P. Viswanath, Fundamentals of Wireless Communication, Cambridge University Press, 2005.

[4] G. J. Foschini and M. J. Gans, "On limits of wireless communications in a fading environment when using multiple antennas," Wireless Pers. Commun., vol. 6, pp. 311-335, March 1998.

[5] I. E. Telatar, "Capacity of multi-antenna Gaussian channels," European Trans. Telecommun., vol. 10, no. 6, pp. 585-595, November 1999.

[6] G. J. Foschini, "Layered space-time architecture for wireless communication in a fading environment when using multi-element antennas," Bell Labs Tech. Jl., vol. 1, pp. 41 59, August 1996.

[7] X. Yang, Y. Xiong, and F. Wang, "An adaptive MIMO system based on unified belief propagation detection," Proc. IEEE ICC'2007, Glasgow, June 2007.

[8] Y. Sun, "A family of linear complexity likelihood ascent search detectors for CDMA multiuser detection," Proc. IEEE 6th Intl. Symp. on Spread Spectrum Tech. & App., September 2000.

[9] K. Vishnu Vardhan, Saif K. Mohammed, A. Chockalingam, and B. Sundar Rajan, "A low-complexity detector for large MIMO systems and multicarrier CDMA systems," to appear in IEEE JSAC Spl. Iss. on Multiuser Detection for Advanced Communication Systems and Networks, May 2008.

[10] Saif K. Mohammed, K. Vishnu Vardhan, A. Chockalingam, and B. Sundar Rajan, "Large MIMO Systems: A low-complexity detector at high spectral efficiencies," to appear in Proc. IEEE ICC'2008, Beijing, China, May 2008.

[11] H. D. Zhu, B. Farhang-Boroujeny, and R.-R. Chen, "On the performance of sphere decoding and Markov chain Monte Carlo detection methods," IEEE Signal Proc. Letters, vol. 12, no. 10, pp. 669-672, October 2005.

[12] B. Farhang-Boroujeny, H. Zhu, and Z. Shi, "Markov chain Monte Carlo algorithms for CDMA and MIMO communication systems," IEEE Trans. on Sig. Proc., vol. 54, no. 5, pp. 1896-1908, May 2006.

[13] D. Pham, K. Pattipati, P. Willett, and J. Luo, "A generalized probabilistic data association detector for multiple antenna systems," IEEE Commun. Lett., vol. 8, no. 4, pp. 205207, April 2004.

[14] P. H. Tan and L. K. Rasmussen, "Asymptotically optimal nonlinear MMSE multiuser detection based on multivariate Gaussian approximation," IEEE Trans. Commun., vol. 54, pp. 1427-1438, August 2006.

[15] B. A. Sethuraman, B. S. Rajan, and V. Shashidhar, "Full-diversity, high-rate space-time block codes from division algebras," IEEE Trans. Inform. Theory, vol. 49, no. 10, pp. 2596-2616, October 2003.

[16] B. Hassibi and B. Hochwald, "High rate codes that are linear in space and time," IEEE Trans. Inform. Theory, vol. 48, pp. 1804-1824, July 2002.

[17] S. M. Alamouti, "A simple transmit diversity technique for wireless communications," IEEE Jl. Sel. Areas in Commun., vol. 16, no. 8, pp. 1451-1458, October 1998.

[18] V. Tarokh, N. Seshadri, and A. R. Calderbank, "Space-time codes for high data rate wireless communications: Performance criterion and code construction," IEEE Trans. Inform. Theory, vol. 44, no. 2, pp. 744-765, March 1998.

[19] V. Tarokh, H. Jafarkhani, and A. R. Calderbank, "Space-time block codes from orthogonal designs," IEEE Trans. Inform. Theory, vol. 45, no. 5, pp. 1456-1467, July 1999.

[20] D. Gesbert, H. Bolcskei, D. A. Gore, A. J. Paulraj, "Outdoor MIMO wireless channels: Models and performance prediction," IEEE Transion Commun., vol. 50, pp. 1926-1934, December 2002.

[21] B. Hassibi and B. M. Hochwald, "How much training is needed in multiple-antenna wireless links?" IEEE Trans. Inform. Theory, vol. 49, no. 4, pp. 951-963, April 2003.

[22] P. Stoica and G. Ganesan, "Space-time block codes: trained, blind and semi-blind detection," Proc. IEEE ICASSP'2002, vol. 2, pp. 1609-1612, 2002.

[23] A. Zaki, Saif K. Mohammed, A. Chockalingam, and B. S. Rajan, "A training-based iterative detection/channel estimation scheme for large non-orthogonal STBC MIMO systems," accepted in IEEE ICC'2009, Dresden, June 2009.

OBJECTS OF THE INVENTION

The primary object of the present invention is to provide a system and a multistage signal detection method to jointly detect the data symbols transmitted from multiple transmit antennas in a communication terminal and received using multiple receive antennas in another communication terminal.

Yet another object of the present invention is to provide novel multistage multiple-symbol update search method that forms a key component of said multistage signal detection method.

Still another object of the present invention is to provide a novel method to generate soft decision outputs from the multistage signal detection method.

STATEMENT OF THE INVENTION

Accordingly, the present invention provides for a method to detect data transmitted by multiple antennas, said method comprising acts of: selecting a starting data block wherein the starting data block is either a random data block or an output data block from known detectors, changing each symbol of the starting data block one symbol at a time to identify a data block which has minimum euclidean distance from the starting data block as detected data block, changing two symbol of the detected data block at a time to identify a data block which has minimum euclidean distance from the starting data block as second data block, assigning the second data block as the starting data block and repeating above two steps, if the minimum euclidean distance of second data block is better than that of the detected data block, and determining the detected data block as the data transmitted.

BRIEF DESCRIPTION OF ACCOMPANYING DRAWINGS

The preferred embodiments of the invention will hereinafter be described in conjunction with the appended drawings provided to illustrate and not to limit the invention, in which FIG. 1 shows uncoded BER performance of the proposed M-LAS detector in V-BLAST for different values of $N_t=N_r$. MMSE initial filter, 4-QAM. BER improves with increasing $N_t=N_r$.

FIG. 2 shows comparison of M-LAS and LAS performance in V-BLAST in the tens of antennas regime $N_t=N_r=64$, 32. MMSE initial filter, 4-QAM. M-LAS outperforms LAS.

FIG. 3 shows ergodic capacity for 64×64 and 128×128 MIMO systems with receive CSI.

FIG. 4 shows turbo coded BER performance of the proposed M-LAS detector in V-BLAST with hard and soft decision for $N_t=N_r=64$ and 128. MMSE initial filter, 4-QAM, rate-¾ turbo code, 96 bps/Hz for $N_t=N_r=64$ and 192 bps/Hz for $N_t=N_r=128$. M-LAS detector with soft decision performs to within about 4 to 4.5 dB from theoretical capacity.

FIG. 5 shows turbo coded BER performance of the proposed M-LAS detector in V-BLAST with hard and soft decision for $N_t=N_r=600$. MF initial filter, BPSK, rate-⅓ turbo code, 200 bps/Hz. M-LAS detector with soft decision performs to within about 3.2 dB from theoretical capacity.

Figure 9:
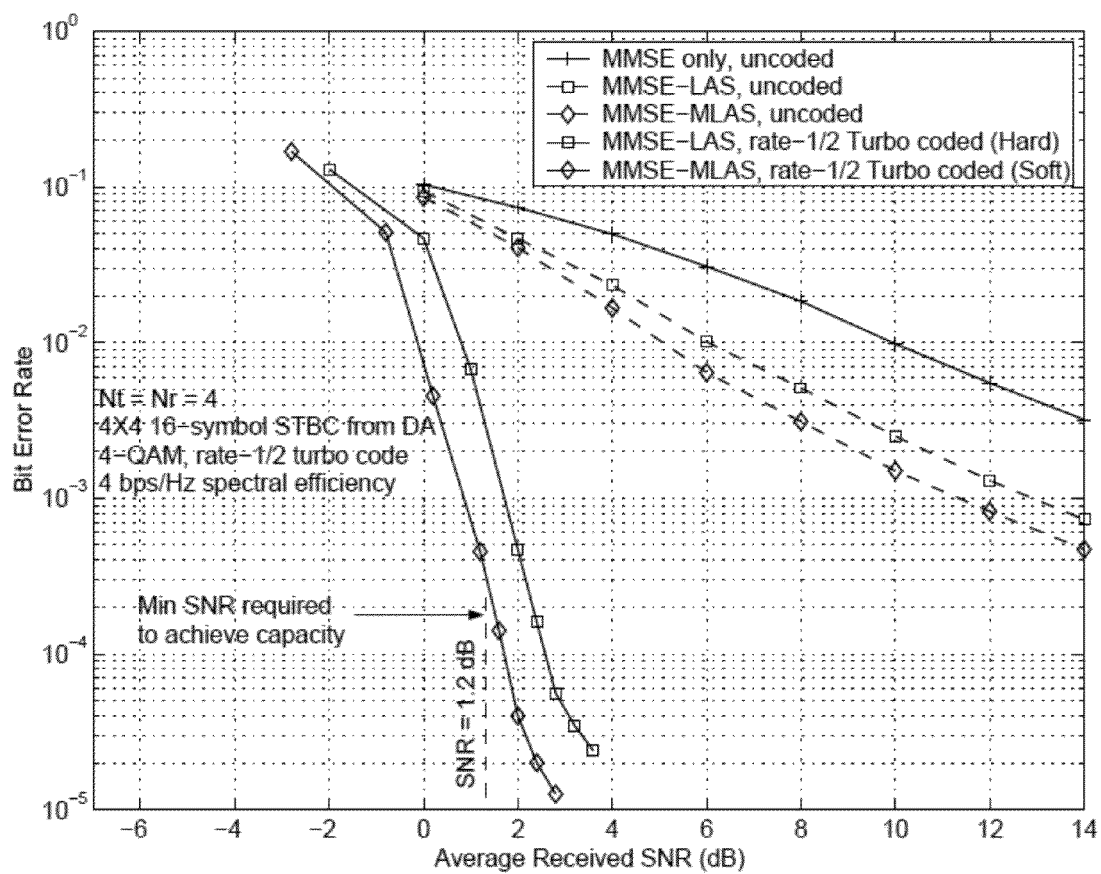

FIG. 9 shows uncoded and coded BER performance of the proposed M-LAS detector in decoding 4×4 full-rate non-orthogonal STBC from division algebras given by (45). MMSE initial filter, 4-QAM, rate-½ turbo code, 4 bps/Hz spectral efficiency, $N_t=N_r=4$. M-LAS with soft decision performs close to within about 1 dB from capacity.

Figure 10:
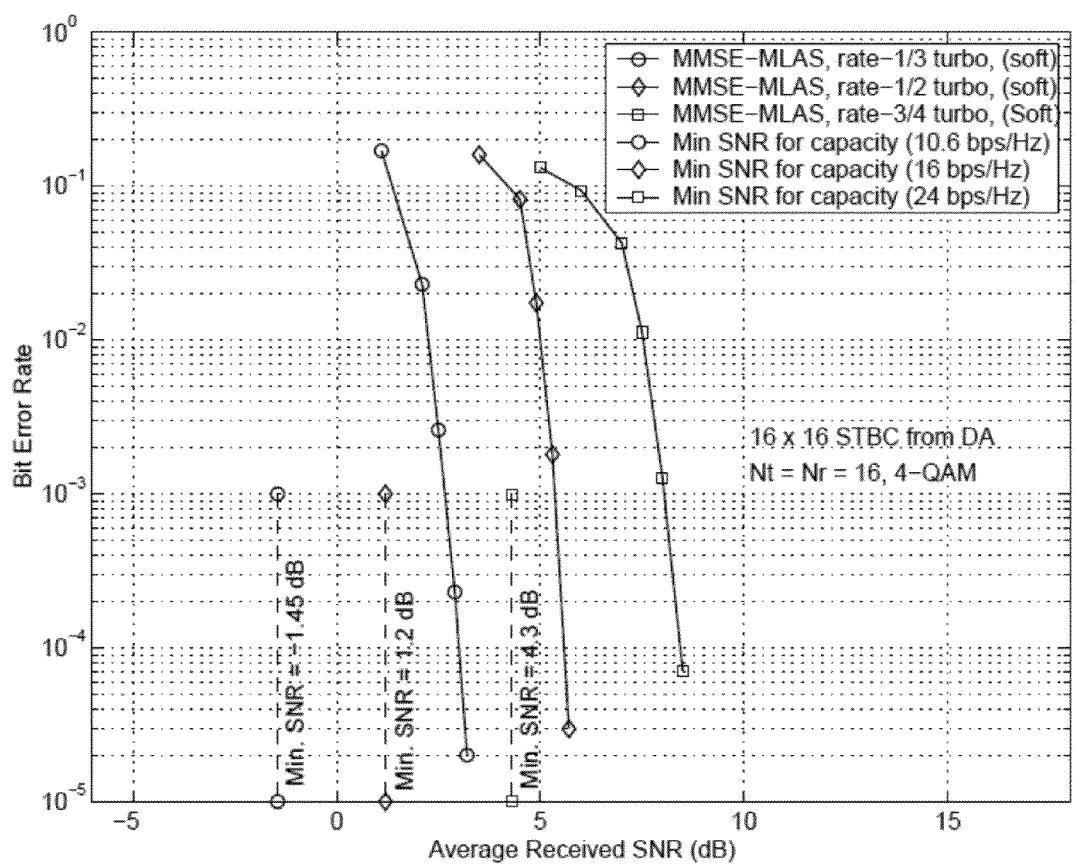

FIG. 10 shows turbo coded BER performance of the proposed M-LAS detector with soft decision in decoding 16×16 full-rate non-orthogonal STBC from division algebras given by (45). $N_t=N_r=16$. MMSE initial filter, 4-QAM. Rates of turbo codes and corresponding spectral efficiencies: (rate-⅓, 10.66 bps/Hz), (rate-½, 16 bps/Hz), and (rate-¾, 24 bps/Hz). MLAS with soft decision performs close to within about 4 dB from capacity.

Figure 11:
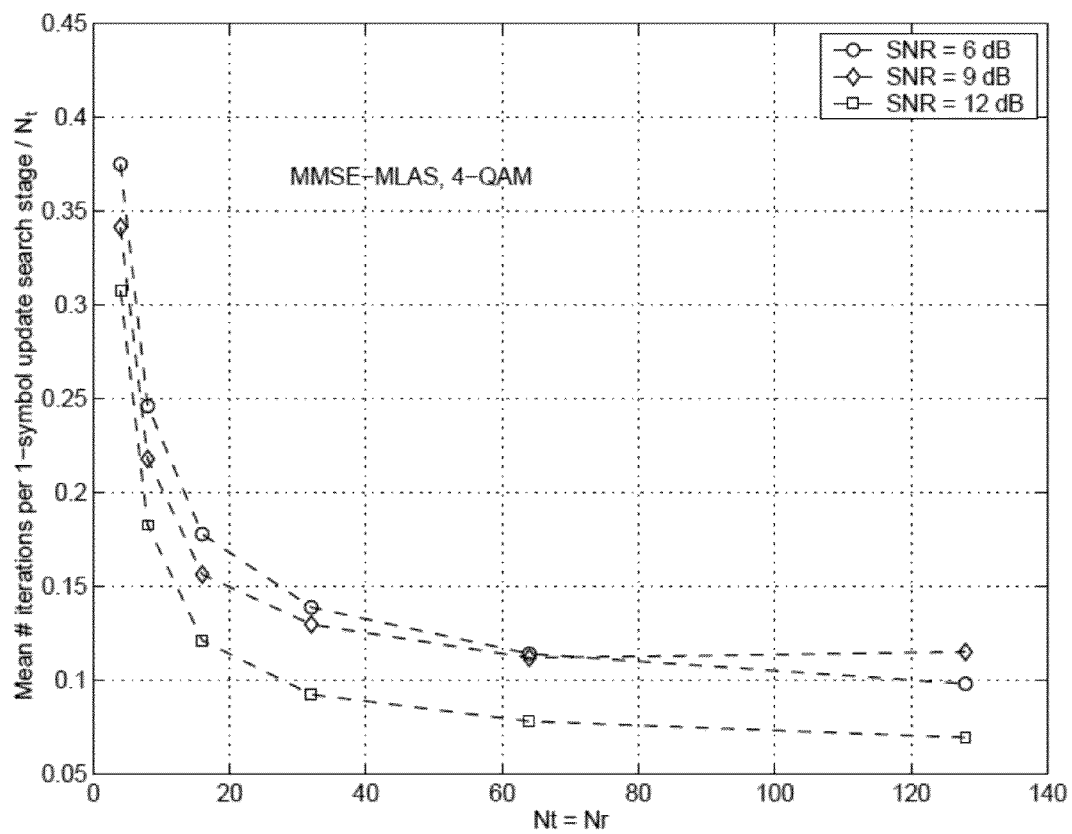

FIG. 11 shows complexity of M-LAS in terms of mean number of iterations per 1-symbol update search per transmit antenna in V-BLAST as a function of $N_t=N_r$ for different SNRs. MMSE initial vector. 4-QAM. Results obtained from simulations.

Figure 12:
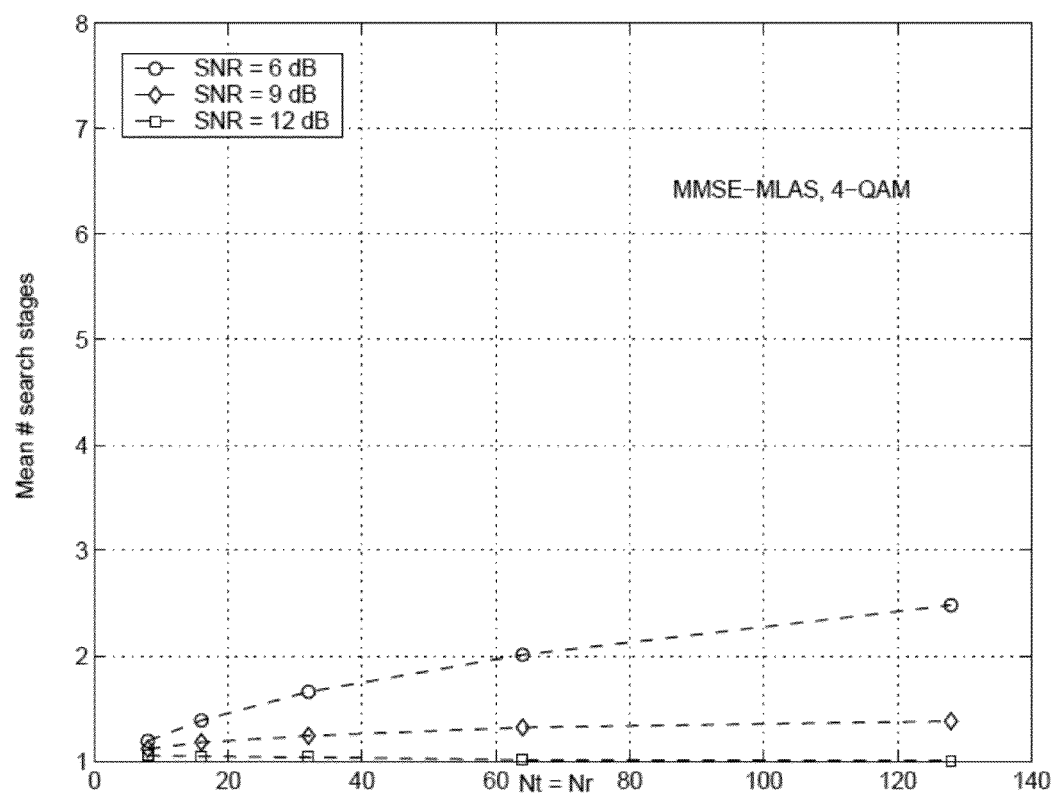

FIG. 12 shows complexity of M-LAS in terms of mean number of search stages in V-BLAST as a function of $N_t=N_r$ for different SNRs. MMSE initial vector. 4-QAM. Results obtained from simulations.

Figure 13:
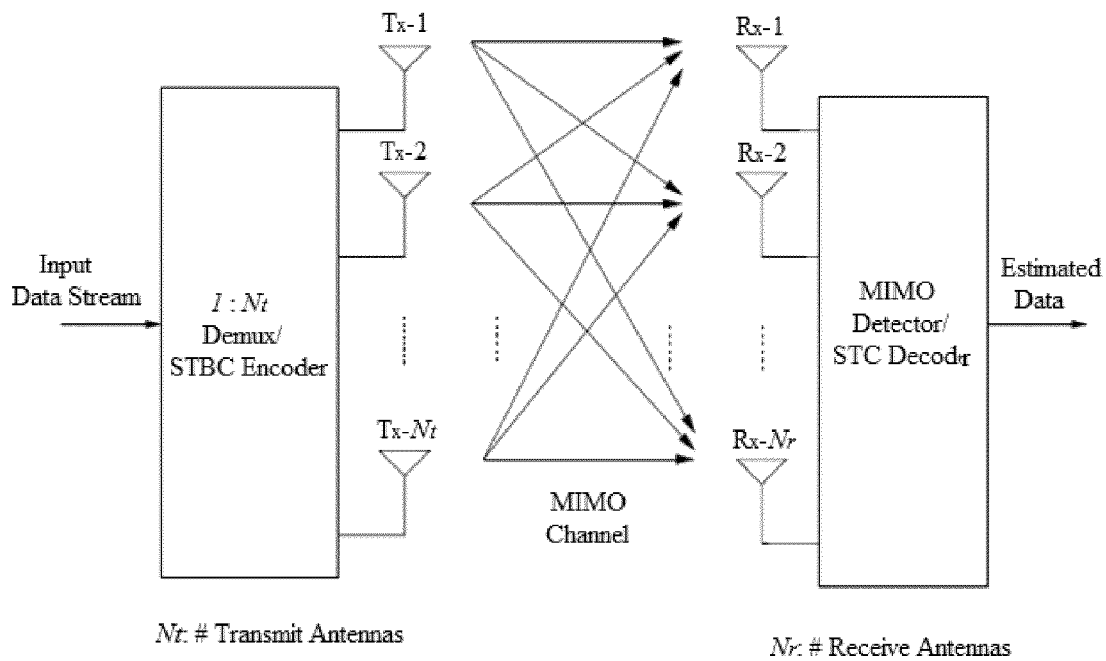

FIG. 13 shows a MIMO system with multiple transmitting and multiple receiving antennas.

Figure 14:
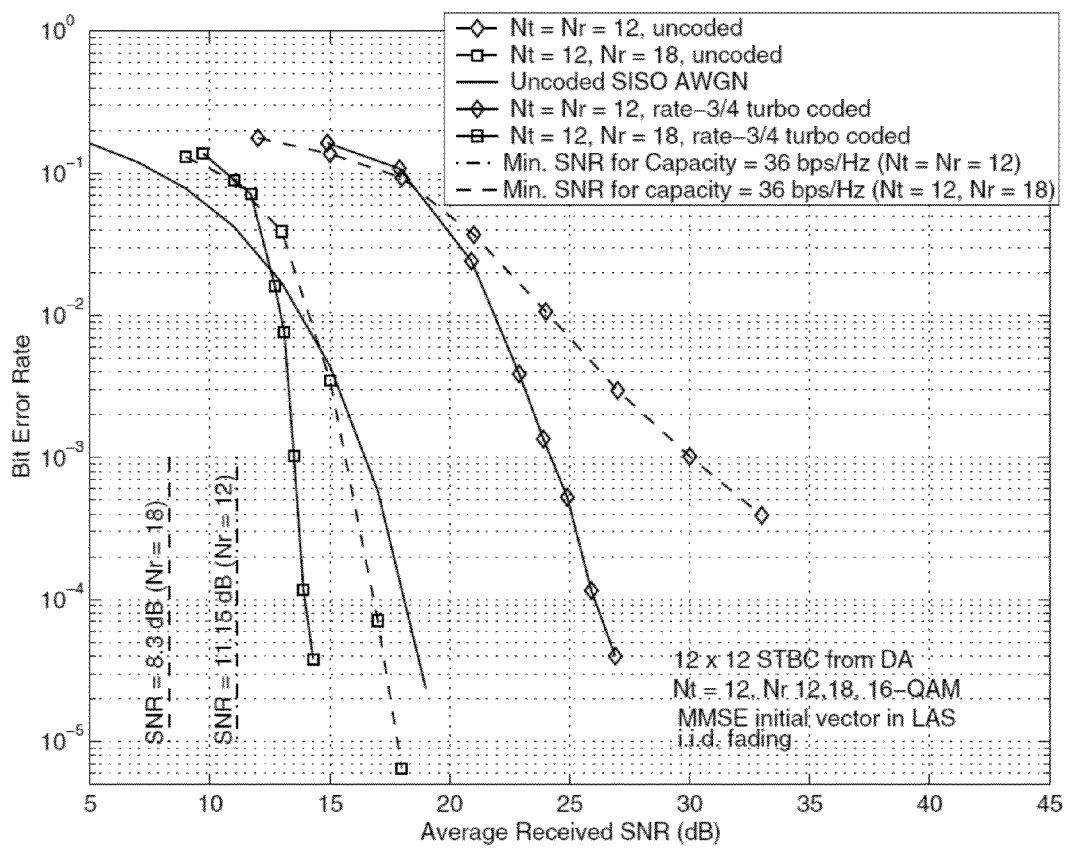

FIG. 14 shows effect of symmetric large MIMO with Nr>Nt in i.i.d. fading. 12×12 STBC from DA, Nt=12, Nr=12, 18, 16-QAM, rate-¾ turbo code, 36 bps/Hz spectral efficiency. MMSE initial vector in LAS detection.

Figure 15:
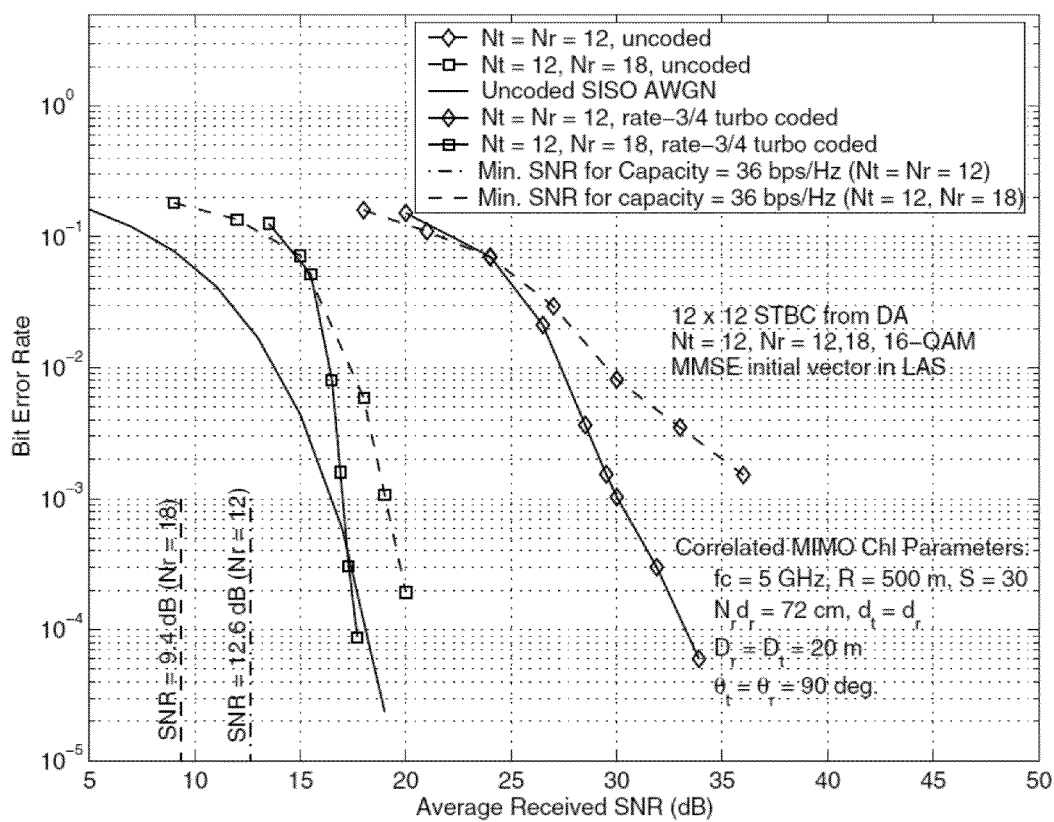

FIG. 15 shows effect of asymmetric large MIMO with Nr>Nt in correlated MIMO fading in reference [20] keeping Nrdr constant and dt=dr, Nrdr=72 cm, fc=5 GHz, R=500 m, S=30, Dt=Dr=20 m, θt=θr=90°, 12×12 STBC from DA, Nt=12, Nr=12, 18, 16-QAM, rate-¾ turbo code, 36 bps/Hz spectral efficiency. MMSE initial vector in LAS detection.

Figure 16:
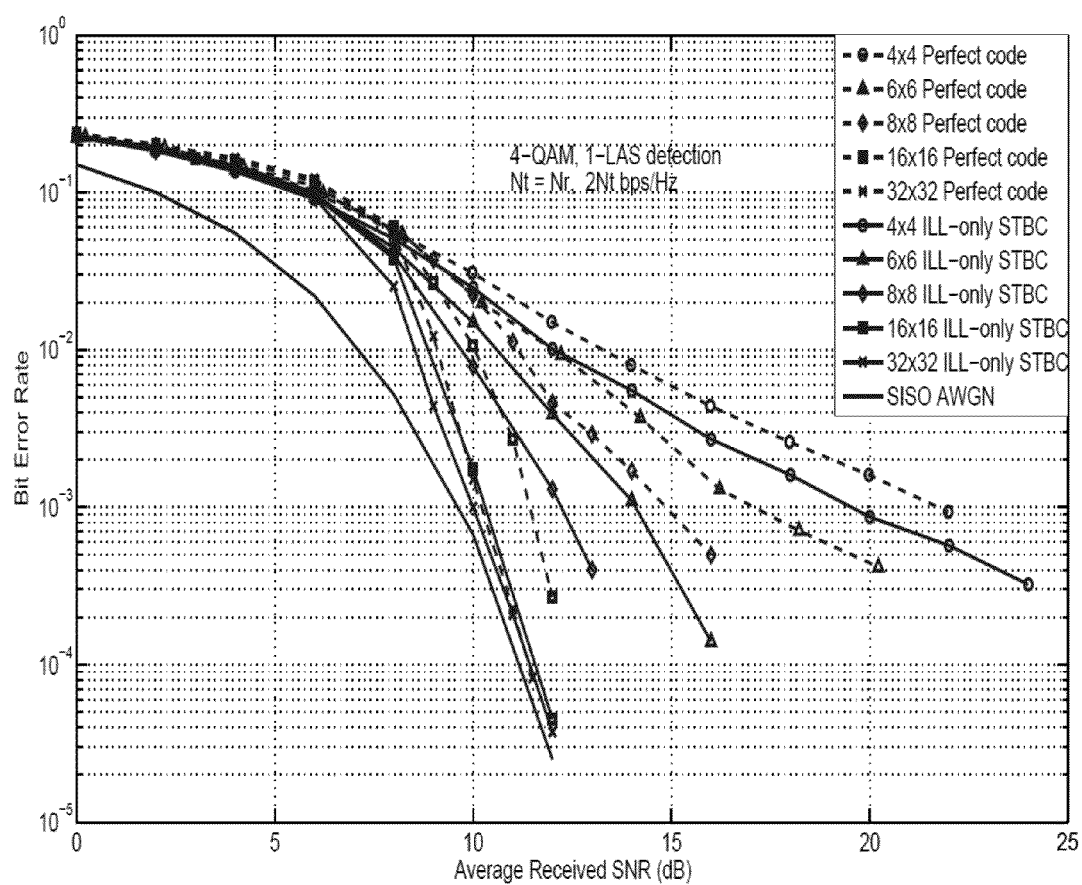

FIG. 16 shows uncoded BER comparison between perfect codes and ILL-only STBCs for different $N_t=N_r$, 4-QAM, 2Nt bps/Hz, 1-LAS detection. For small dimensions (e.g., 4×4, 6×6, 8×8), perfect codes with 1-LAS detection perform worse than ILL-only STBCs. For large dimensions (e.g., 16×16, 32×32), ILL-only STBCs and perfect codes perform almost same.

Figure 17:
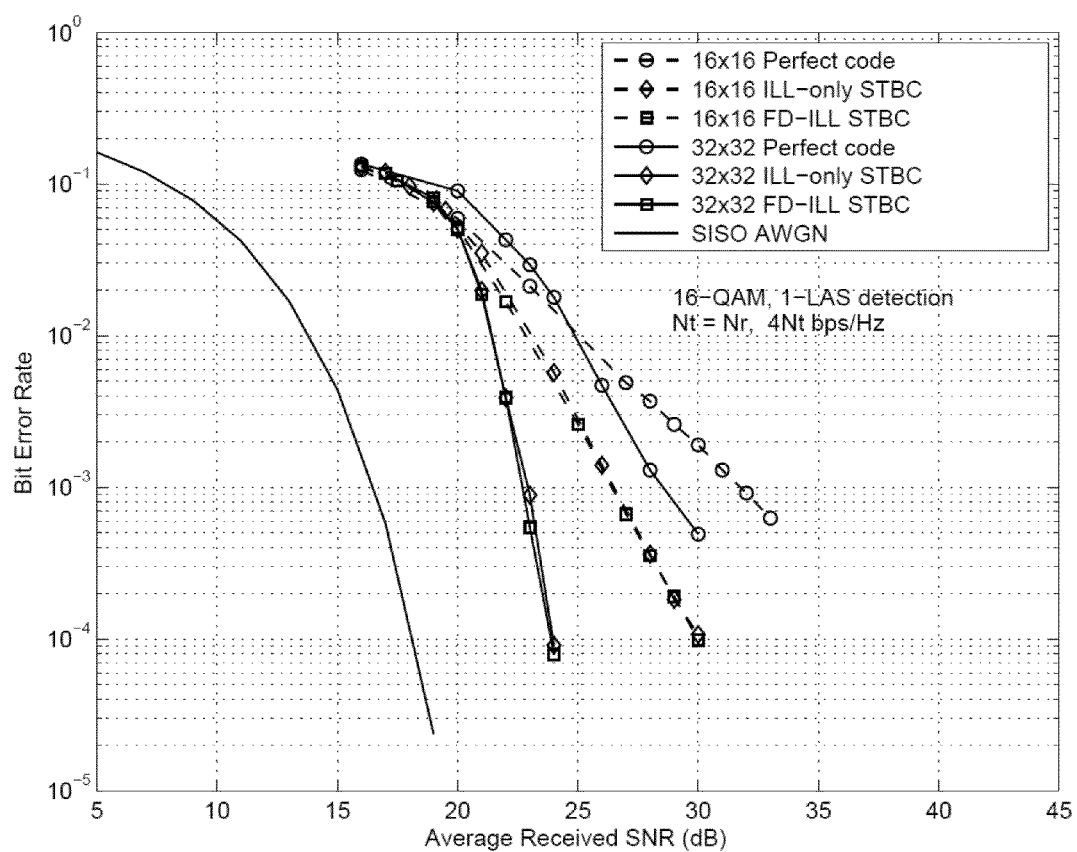

FIG. 17 shows Uncoded BER comparison between perfect codes, ILL-only, and FD-ILL STBCs for $N_t=N_r=16$, 32, 16-QAM, 4Nt bps/Hz, 1-LAS detection. For larger modulation alphabet sizes (e.g., 16 QAM), perfect codes with 1-LAS detection perform poorer than ILL-only and FD-ILL STBCs.

Figure 18:
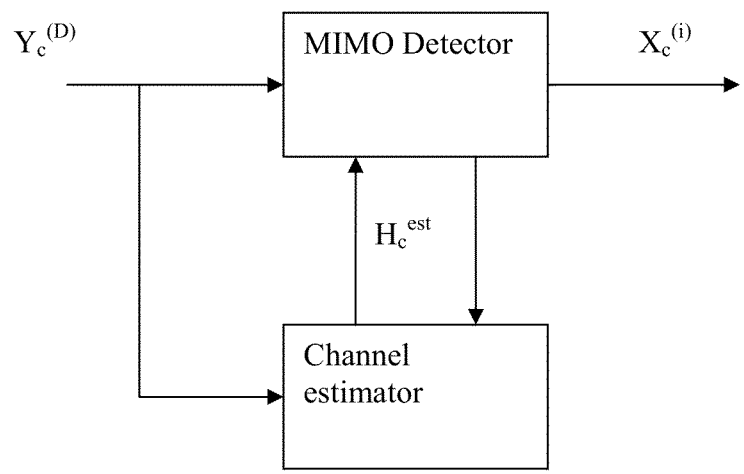

FIG. 18 shows a block diagram of iterative detection estimation model.

Figure 19:
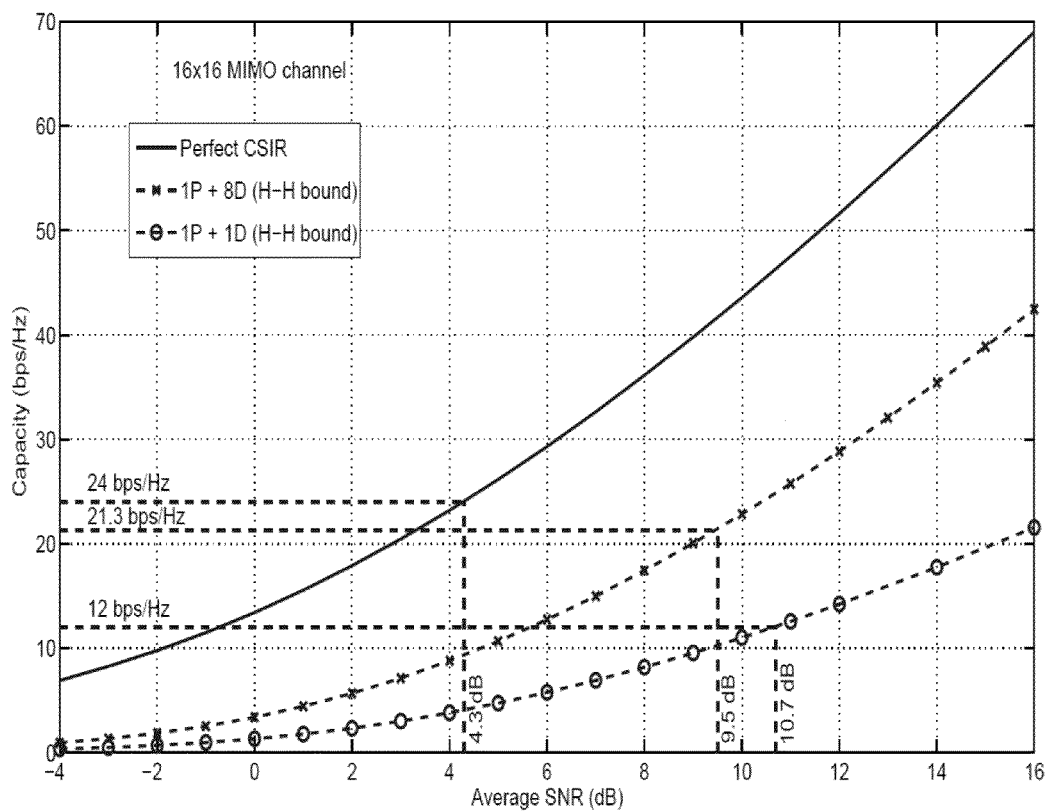

FIG. 19 shows Hassibi-Hochwald (H-H) capacity bound for $$1P + 8D \left(T = 144, \tau = 16, \beta_p = \frac{1}{2}, \beta_d = \frac{15}{16}\right) \text{ and}$$

$$1P + 1D \left(T = 16, \tau = 16, \beta_p = \beta_d = \frac{1}{2}\right)$$

training for a 16×16 MIMO channel. Perfect CSIR capacity is also shown.

Figure 20:
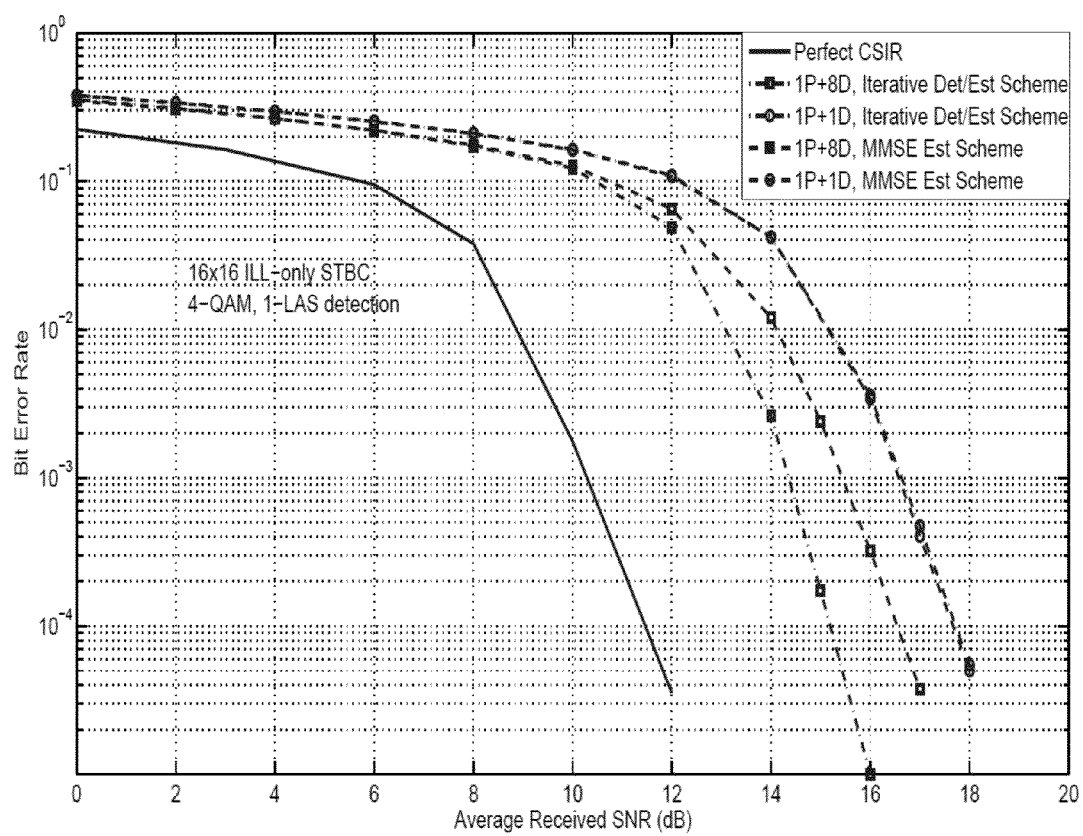

FIG. 20 shows uncoded BER of 1-LAS detector for 16×16 ILL-only STBC with i) perfect CSIR, ii) CSIR using MMSE estimation scheme, and iii) CSIR using iterative detection/channel estimation scheme.

$$N_t = N_r == 16, \text{4-QAM}, 1P + 1D \left(T = 16, \tau = 16, \beta_p = \beta_d = \frac{1}{2}\right) \text{ and}$$

$$1P + 8D \left(T = 144, \tau = 16, \beta_p = \beta_d = \frac{15}{16}\right)$$

training.

Figure 21:
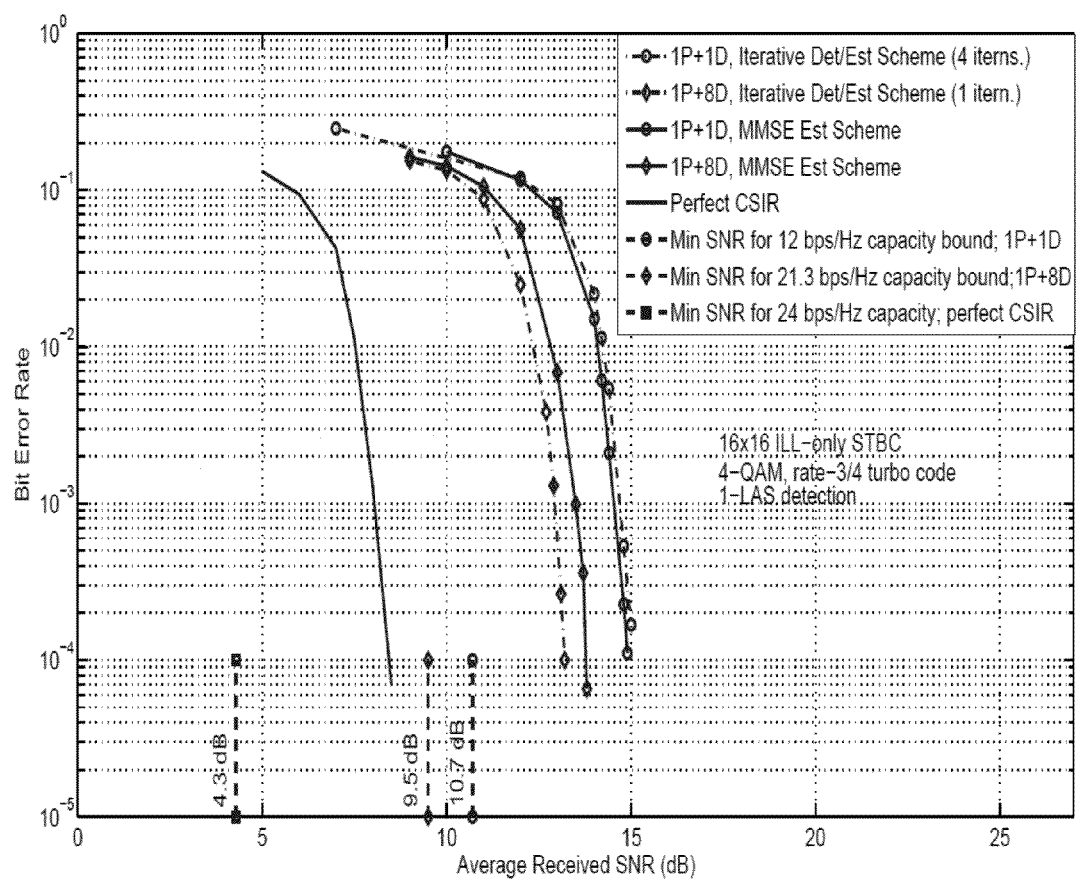

FIG. 21 shows turbo coded BER performance of 1-LAS detector for 16×16 ILL-only STBC with i) perfect CSIR, ii) CSIR using MMSE estimation, and iii) CSIR using iterative detection/channel estimation. Nt=Nr=16, 4-QAM, rate-¾ turbo code, $$1P + 1D \left(T = 16, \tau = 16, \text{ and } \beta_p = \beta_d = \frac{1}{2}\right)$$

$$1P + 8D \left(T = 144, \tau = 16, \beta_p = \beta_d = \frac{15}{16}\right)$$

training.

FIG. 22: Transmission scheme with one pilot matrix followed by $N_d$ data STBC matrices in each frame.

DETAILED DESCRIPTION OF THE INVENTION

The present disclose is related to a method to detect data transmitted by multiple antennas, said method comprising acts of:
 a) selecting a starting data block wherein the starting data block is either a random data block or an output data block from known detectors,
 b) changing each symbol of the starting data block one symbol at a time to identify a data block which has minimum euclidean distance from the starting data block as detected data block,
 c) changing two symbol of the detected data block at a time to identify a data block which has minimum euclidean distance from the starting data block as second data block,
 d) assigning the second data block as the starting data block and repeating said steps 'b' and 'c', if the minimum euclidean distance of second data block is better than that of the detected data block, and
 e) determining the detected data block as the data transmitted.

In one embodiment of the present invention changing three symbols of the detected data block at a time to identify a data block which has minimum euclidean distance from the starting data block as third data block.

In one embodiment of the present invention assigning the third data block as the starting data block and repeating said steps 'b' to 'e', if the minimum euclidean distance of the third data block is better than that of the detected data block and determining the detected data block as the data transmitted.

In one embodiment of the present invention defining a set of indices of symbols to be checked for possible flip in the steps 'b', 'c' and in claim 2.

In one embodiment of the present invention the method provides for generating soft decision outputs for individual bits to be fed as input to turbo decoder.

In one embodiment of the present invention providing a pilot block prior to the data block for channel estimation.

In one embodiment of the present invention the channel estimation determines channel gain to detect the starting data block.

In one embodiment of the present invention re-estimating the channel gain using the detected data block.

In one embodiment of the present invention the cannel gain re-estimation is for a predetermined number of iterations.

In one embodiment of the present invention the method uses brute-force or approximate method to compute cost difference.

In one embodiment of the present invention the method comprises data transmissions using higher order modulation format selected from a group comprising M-array Quadrature Amplitude Modulation (M-QAM) and M-array Pulse Amplitude Modulation (M-PAM).

In one embodiment of the present invention the method detects data symbols transmitted from the multiple transmit antennas using MIMO technique selected from a group comprising Space-Time Block Coding (STBC) and V-BLAST.

In one embodiment of the present invention the known detector is selected from a group comprising of matched filter, zero-forcing filter and Minimum Mean-Squared Error (MMSE) filter.

In one embodiment of the present invention the method provides for detection in multi-user OFDM/OFDMA and MIMO-OFDM systems with multiple subcarriers.

In one embodiment of the present invention the method provides for detection in Ultra-wide band (UWB) systems or impulse radio systems with multiple users and multiple channel taps.

In one embodiment of the present invention the method provides for detection in underwater acoustic communications with multiple nodes deployed to sense and send information.

In one embodiment of the present invention the method detects data symbols transmitted from the multiple transmit antennas wherein number of transmit antennas is less than number of receiving antennas.

The present system also discloses a MIMO system using method as described above.

The multistage LAS (MLAS) detector we propose in this disclosure overcomes the limitation of references [9], [10] by achieving near-ML performance even with tens of antennas1 and that too at low complexity. This is made possible by adopting a multiple-symbol updates based multiple search strategy which incurs a small increase in complexity but achieves near-ML performance even with tens of antennas. Further present M-LAS work in this disclosure differs from the references [9],[10] in two key aspects, namely, i) while the LAS algorithm operates on single-symbol updates based search, in the present M-LAS algorithm we devise a low-complexity, multi-symbol updates based multiple search strategy that results in improved performance compared to that of LAS in the tens of antennas regime, while incurring only a small increase in complexity, and ii) in addition, instant discloser presents a method to generate soft decision M-LAS outputs to be fed as input to the turbo decoder; soft decision outputs generation for LAS is not available in references [9],[10].

In terms of performance, the proposed M-LAS detector achieves an uncoded BER performance which is very close to the AWGN-only SISO performance (within about 1 dB) even with tens of antennas, whereas the LAS needed hundreds of antennas to achieve such nearness to AWGN-only SISO performance. This performance advantage of M-LAS over LAS in the regime of tens of antennas has interesting and significant practical implications, since tens of antennas can be easily placed in moderately sized communication terminals (e.g., laptops, set top boxes) which can enable large MIMO systems to be viable in practice. With a rate-¾ outer turbo code and 4-QAM, the proposed M-LAS detector with soft decision outputs is shown to perform close to within about 4.5 dB and 4 dB of the theoretical MIMO capacity with 64 and 128 antennas at spectral efficiencies of 96 bps/Hz and 192 bps/Hz, respectively. With the proposed soft decision outputs, M-LAS/LAS with hundreds of antennas can perform closer to capacity by an extra 1.5 dB compared to the nearness results reported in reference [10]. For example, in a 600×600 V-BLAST system with rate-⅓ turbo code and BPSK, at a spectral efficiency of 200 bps/Hz, the M-LAS/LAS with the proposed soft decision method performs close to within 3.2 dB of the theoretical capacity. This is by far the best nearness to capacity result reported with a practical low complexity detector in a large MIMO system with such large number of antennas.

In addition, the proposed M-LAS algorithm is successfully adopted for the low complexity decoding of high-rate, non-orthogonal space-time block codes (STBC) from Division Algebras (DA) as in reference [15], which, because of their full-rate attribute, can achieve high spectral efficiencies with less number of antennas. We present interesting uncoded and coded BER performance of n×n STBCs from DA in reference [15] for n=4, 8, and 16 with M-LAS decoding. Quite interestingly, an uncoded BER performance very close to that of AWGN-only SISO performance (within 0.5 dB) is achieved with a 16×16 STBC with 4-QAM and Nt=Nr=16. This is a significant result because with STBCs from DA, the M-LAS is able to achieve AWGN-only SISO performance with just 16 antennas, whereas a similar performance was achieved only using 64 antennas in V-BLAST. This is because of the transmit diversity and coding gains possible with the full-rate STBC approach compared to the VBLAST approach. Further, with an outer turbo code, the M-LAS is shown to perform close to within about 1 to 3 dB of the theoretical capacity, which again is a remarkable result considering that practical low-complexity decoding of such large size non-orthogonal STBCs with such nearness to capacity performance has not been reported in the literature so far. This distinctly establishes the superiority of the proposed M-LAS algorithm in terms of both low complexity and nearness to capacity performance. Given that 4 antenna systems are already defined in the current wireless standards like IEEE 802.11n and IEEE 802.16e, the proposed M-LAS algorithm has good potential for practical application.

Large MIMO systems having tens to hundreds of transmit and receive antennas in a communication terminal is the area of this invention. The key advantage of large MIMO systems is their potential to deliver high data rates at high spectral efficiencies (of the order of tens to hundreds of bps/Hz) that can enable several interesting high data rate wireless applications. The key technical issues involved in large MIMO systems are i) low-complexity MIMO detection, ii) channel estimation, and iii) RF and antenna technologies that include physical placement of large number of antennas in communication terminals. This invention addresses and provides an efficient solution to the issue of low-complexity MIMO detection in large MIMO systems. A block schematic of a MIMO system with multiple transmit and multiple receive antennas is shown in FIG. 13. The present invention is concerned with the MIMO detector block in FIG. 12.

Known MIMO detectors in the literature, including sphere decoder and several of its variants, can achieve near-maximum likelihood (ML) performance, but at the cost of high complexity (cubic complexity or more in number of antennas). Other well known detectors including ZF (zero forcing), MMSE (minimum mean square error), and ZF/SIC (ZF with successive interference cancellation) detectors are attractive from a complexity view point (quadratic or cubic complexity), but achieve relatively poor performance (non-ML performance). The complexity limitation in known ML-achieving detectors prohibits the use of large number of antennas, and hence they can achieve only limited spectral efficiencies typically less than 10 bps/Hz.

A unique feature of the present invention is that it presents a multistage MIMO detection algorithm that achieves near-ML performance (i.e., performs very close to the theoretical capacity) for tens to hundreds of antennas with low detection complexity, and this can enable the practical realization of high spectral efficiencies of the order of tens to hundreds of bps/Hz. The present invention differs from the prior art in that it achieves near-ML performance for tens to hundreds of antennas with low detection complexity. The non-obviousness of the present invention comes from the successful adoption of multiple symbol updates in the search procedure that incurs only a small increase in complexity compared to single symbol updates based search. In addition, the proposed method to generate soft decision outputs from the search algorithm in the invention is non-obvious.

System Model

Consider a V-BLAST system with $N_t$ transmit antennas and $N_r$ receive antennas, $N_t \leq N_r$, where $N_t$ symbols are transmitted from $N_t$ transmit antennas simultaneously. Let $\in X_c \in C^{N_t \times 1}$ be the symbol vector transmitted. Each element of $x_c$ is an M-PAM or M-QAM symbol. M-PAM symbols take discrete values from $\{A_m, m=1, 2, \ldots, M\}$, where $Am = (2m-1-M)$, and M-QAM is nothing but two PAMs in quadrature. Let $H_c \in C^{N_r \times N_t}$ be the channel gain matrix, such that the (p, q)th entry $h_{p,q}$ is the complex channel gain from the qth transmit antenna to the pth receive antenna. Assuming rich scattering, we model the entries of $H_c$ as i.i.d CN(0, 1). Let $yc \in C^{N_r \times 1}$ and $n_c \in C^{N_r \times 1}$ denote the received signal vector and the noise vector, respectively, at the receiver, where the entries of $n_c$ are modeled as i.i.d CN (0, $\sigma^2$). The received signal vector can then be written as $$Y_c = H_c x_c + n_c \qquad (1)$$

Let $y_c$, $H_c$, $x_c$, and $n_c$ be decomposed into real and imaginary parts as follows:

$$y_c = y_I + j y_Q, \quad x_c = x_I + j x_Q$$

$$n_c = n_I + j n_Q, \quad H_c = H_I + j H_Q \qquad (2)$$

Further, we define $H_r \in R^{2N_r \times 2N_t}$, $yr \in R^{2N_r \times 1}$, $X_r \in R^{2N_t \times 1}$, and $n_r \in R^{2N_r \times 1}$ as $$H_r = \begin{pmatrix} H_I & -H_Q \\ H_Q & H_I \end{pmatrix}, \qquad (3)$$

$$y_r = [y_I^T \; y_Q^T]^T,$$

$$x_r = [x_I^T \; x_Q^T]^T,$$

$$n_r = [n_I^T \; n_Q^T]^T.$$

Now, (1) can be written as $$y_r = H_r x_r + n_r \qquad (4)$$

Henceforth, we shall work with the real-valued system in (4). For notational simplicity, we drop subscripts r in (4) and write $$y = Hx + n, \qquad (5)$$

where $H = H_r \in R^{2N_r \times 2N_t}$, $y = y_r \in R^{2N_r \times 1}$, $x = x_r \in R^{2N_t \times 1}$ and $n = n_r \in R^{2N_r \times 1}$. With the above real-valued system model, the real-part of the original complex data symbols will be mapped to $[x_1, \ldots, xN_t]$ and the imaginary-part of these symbols will be mapped to $[x_{N_t+1}, \ldots, x2_{N_t}]$. For M-PAM, $[x_{N_t+1}, \ldots, x2_{N_t}]$ will be zeros since M-PAM symbols take only real values. In the case of M-QAM, $[x_1, \ldots, xN_t]$ can be viewed to be from an underlying M-PAM signal set and so is $[x_{N_t+1}, \ldots, x2_{N_t}]$. Let $A_i$ denote the M-PAM signal set from which $x_i$ takes values, $i=N_{t+1}, \ldots, 2N_t$. For example, for 4-PAM, $A_i = \{-3, -1, 1, 3\}$ for $i=1, 2, \ldots, N_t$ and $A_i = \{0\}$ for $i=N_{t+1}, \ldots, 2N_t$. Similarly, for 4-QAM, after transforming the system into an equivalent real-valued system, $A_i = \{1,-1\}$ for $i=1, 2, \ldots, N_t$. Now, define a $2N_t$ dimensional signal space S to be the Cartesian product of $A_1$ to $A_{2N_t}$. For ML detection, the solution is given by $$d_{ML} = \underset{d \in S}{\operatorname{argmin}} \| y - Hd \|^2 \qquad (6)$$

$$= \underset{d \in S}{\operatorname{argmin}} d^T H^T H d - 2 y^T H d.$$

whose complexity is exponential in $N_t$. We present a low-complexity, near-ML performance achieving detector, termed as multistage likelihood ascent search (M-LAS) detector, in the following section.

M-LAS Detector

The proposed M-LAS algorithm essentially consists of a sequence of likelihood-ascent search stages, where the likelihood increases monotonically with every search stage. Each search stage consists of several iterations, where updating one symbol per iteration such that the likelihood monotonically increases from one iteration to the next until a local minima is reached. (Local minima is the minimum euclidean distance, i.e. distance between two signal points is the energy is the difference between the two signal points) Upon reaching this local minima, a 2-symbol and/or a 3-symbol update is tried in order to further increase the likelihood. If this likelihood increase happens, then initiate the next search stage starting from this new point. The algorithm terminates at the stage from where further likelihood increase does not happen.

The M-LAS algorithm starts with an initial solution $d^{(o)}$, given by $d^{(o)} = By$, where B is the initial solution filter, which can be a matched filter (MF) or zero-forcing (ZF) filter or MMSE filter. The index m in $d^{(m)}$ denotes the iteration number in a given search stage. The ML cost function after the $k^{th}$ iteration in a given search stage is given by $$C^{(k)} = d^{(k)T} H^T H d^{(k)} - 2 y^T H d^{(k)}. \qquad (7)$$

Each search stage would involve a sequence of 1-symbol updates followed by a 2 and/or a 3 symbol update.

One-Symbol Update

Let us assume that we update the pth symbol in the (k+1)th iteration; p can take value from $1, \ldots N_t$ for M-PAM and $1, \ldots 2N_t$ for M-QAM. The update rule can be written as $$d^{(k+1)} = d^{(k)} + \lambda_p^{(k)} e_p, \qquad (8)$$

where ep denotes the unit vector with its pth entry only as one, and all other entries as zero. Also, for any iteration k, $d^{(k)}$ should belong to the space S, and therefore $\lambda_p^{(k)}$ can take only certain integer values. For example, in case of 4-PAM or 16-QAM (both have the same signal set $Ap = \{-3, -1, 1, 3\}$), $\lambda_p^{(k)}$ can take values only from $\{-6, -4, -2, 0, 2, 4, 6\}$. Using (7) and (8), and defining a matrix G as $$G \triangleq H^T H, \qquad (9)$$

we can write the cost difference $\Delta C_p^{k+1} @ C^{(k+1)} - C^{(k)}$ as $$\Delta C_p^{k+1} = \lambda_p^{(k)^2} (G)_{p,p} - 2 \lambda_p^{(k)} z_p^{(k)},$$

where $h_p$ is the pth column of H, $z^{(k)} = H^T (y - Hd^{(k)})$, $z_p^{(k)}$ is the pth entry of the $z^{(k)}$ vector, and $(G)_{p,p}$ is the (p, p)th entry of the G matrix. Also, let us define $a_p$ and $l_p^{(k)}$ as $$a_p = (G)_{p,p}, \quad l_p^{(k)} = |\lambda_p^{(k)}|. \qquad (10)$$

With the above variables defined, we can rewrite (10) as $$\Delta C_p^{k+1} l_p^{(k)^2} a_p - 2 l_p^{(k)} |z_p^{(k)}| \operatorname{sgn}(\lambda_p^{(k)}) \operatorname{sgn}(z_p^{(k)}), \qquad (11)$$

where sgn(•) denotes the signum function. For the ML cost function to reduce from the kth to the (k+1)th iteration, the cost difference should be negative. Using this fact and that ap and $l_p^{(k)}$ are non-negative quantities, we can conclude from (11) that the sign of $\lambda_p^{(k)}$ must satisfy $$\operatorname{sgn}(\lambda_p^{(k)}) = \operatorname{sgn}(z_p^{(k)}). \qquad (12)$$

Using (12) in (11), the ML cost difference can be rewritten as $$F(l_p^{(k)}) \triangleq \Delta C_p^{k+1} = l_p^{(k)2} a_p - 2l_p^{(k)} |z_p^{(k)}|. \quad (13)$$

For $F(l_p^{(k)})$ to be non-positive, the necessary and sufficient condition from (13) is that $$l_p^{(k)} < \frac{2|z_p^{(k)}|}{a_p}. \quad (14)$$

However, we can find the value of $l_p^{(k)}$ which satisfies (14) and at the same time gives the largest descent in the ML cost function from the kth to the (k+1)th iteration (when symbol p is updated). Also, $l_p^{(k)}$ is constrained to take only certain integer values, and therefore the brute-force way to get optimum $l_p^{(k)}$ is to evaluate $F(l_p^{(k)})$ at all possible values of $l_p^{(k)}$. This would become computationally expensive as the constellation size M increases. However, for the case of 1-symbol update, we could obtain a closed-form expression for the optimum $l_p^{(k)}$ that minimizes $F(l_p^{(k)})$, which is given by $$l_{p,opt}^{(k)} = 2 \left\lfloor \frac{|z_p^{(k)}|}{2a_p} \right\rfloor, \quad (15)$$

where $\lfloor \cdot \rfloor$ denotes the rounding operation. If the pth symbol in $d^{(k)}$, i.e., $d_p^{(k)}$, were indeed updated, then the new value of the symbol would be given by $$\tilde{d}_p^{(k+1)} = d_p^{(k)} + l_p^{(k)} \mathrm{sgn}(z_p^{(k)}) \quad (16)$$

However, $$\tilde{d}_p^{(k+1)}$$

can take values only in the set Ap, and therefore we need to check for the possibility of $$\tilde{d}_p^{(k+1)}$$

being greater than (M−1) or less than −(M−1). If $$\tilde{d}_p^{(k+1)}$$

>(M−1), then $l_p^{(k)}$ is adjusted so that the new value of $$\tilde{d}_p^{(k+1)}$$

with the adjusted value of $l_p^{(k)}$ (using (16)) is (M−1). Similarly, if $$\tilde{d}_p^{(k+1)}$$

<−(M−1), then $l_p^{(k)}$ is adjusted so that the new value of $$\tilde{d}_p^{(k+1)}$$

is −(M−1). That is, if $$\tilde{d}_p^{(k+1)}$$

>(M−1), the adjustment equation is $$l_p^{(k)} = l_p^{(k)} - \mathrm{sgn}(z_p^{(k)})(\tilde{d}_p^{(k+1)} - (M-1)). \quad (17)$$

and if $$\tilde{d}_p^{(k+1)}$$

<−(M−1), the adjustment equation is $$l_p^{(k)} = l_p^{(k)} - \mathrm{sgn}(z_p^{(k)})(\tilde{d}_p^{(k+1)} + (M-1)). \quad (18)$$

Let $$\tilde{l}_{p,opt}^{(k)}$$

be obtained from $l_p^{(k)}$ by using the adjustment equations (17) and (18). It can be shown that if $F(l_{p,opt}^{(k)})$ is non-positive, then $$F(\tilde{l}_{p,opt}^{(k)})$$

is also non-positive. We compute $$F(\tilde{l}_{p,opt}^{(k)}),$$

$\forall p = 1, \ldots 2N_t$. Now, given $$F(\tilde{l}_{p,opt}^{(k)}),$$

$\forall p$, let $$s = \arg\min_p F(l_{p,opt}^{(k)}). \quad (19)$$

If $$F(i_{p,opt}^{(k)}),$$

<0, the update for the (k+1)th iteration is $$d^{(k+1)} = d^{(k)} + l_s^{(k)} \text{sgn}(z_s^{(k)}) e_s, \quad (20)$$

$$z^{(z+1)} = z^{(z)} + l_s^{(k)} \text{sgn}(z_s^{(k)}) g_s, \quad (21)$$

where gs is the sth column of G. The update in (21) follows from the definition of $z^{(k)}(k)$ in (10). If $$F(i_{p,opt}^{(k)}),$$

≥0, then the 1-symbol update search terminates. The data vector at this point is referred to as '1-symbol update local minima.' After reaching the 1-symbol update local minima, we look for a further decrease in the cost function by updating multiple symbols simultaneously.

Why Multiple Symbol Updates

The motivation for trying out multiple symbol updates can be explained as follows. Let $L_K \subseteq S$ s denote the set of data vectors such that for any $d \in L_K$, if a K-symbol update is performed on d resulting in a vector d' then Py-Hd'P≥P y-H d'P. We note that $d_{ML} \in L_K$, =1, 2, . . . , $2N_t$, because any number of symbol updates on $d_{ML}$ will not decrease the cost function. We define another set $M_k = \cap_{j=1}^{k} L_j$. Note that $d_{ML} \in M_K$, $\forall K=1, 2, \ldots, 2N_t$ and $M_{2N_t} = \{d_{ML}\}$, i.e. $M_{2N_t}$ is a singleton set with $d_{ML}$ as the only element. Also, $|M_{k+1}| \leq |M_k|$, K=1, 2, . . . , 2 N. For any $d \in M_K$, $d \in M_K$, K=1, 2, . . . , 2 $N_t$ and $d \neq d_{ML}$, it can be seen that d and $d_{ML}$ will differ in K+1 or more locations. Since $d_{ML} \in M_K$, and $|M_k|$ decreases monotonically with increasing K, there will be lesser non-ML data vectors to which the algorithm can converge to for increasing K. In addition, at moderate to high SNRs, $d_{ML}$=x with high probability. Therefore, the separation between any $d \in M_K$, and x will monotonically increase with increasing K with high probability. Therefore, the probability of the noise vector n inducing an error would decrease with increasing K. This indicates that K-symbol updates with large K could get near to ML performance. However, the overall complexity with up to K-symbol simultaneous updates allowed would be of order O ($N_t^K$). So, in order to limit the complexity to O ($N_t^2$) per symbol, we restrict the updates to K=3. Since only up to 3-symbol updates are considered in the proposed algorithm, it follows that the algorithm would always converge to a data vector in $M_3$. As we will see in Sec. 4, close-to ML performance is achieved with the M-LAS algorithm even for K=3.

Two-Symbol Update

Let us consider 2-symbol update in this subsection. Let us assume that we update the pth and qth symbols in the (k+1)th iteration; p and q can take values from 1, . . . , $N_t$ for M-PAM and 1, . . . , $2N_t$ for M-QAM. The update rule for the 2-symbol update can be written as $$d^{(k+1)} = d^{(k)} + \lambda_p^{(k)} e_p + \lambda_q^{(k)} e_q. \quad (22)$$

For any iteration k, $d^{(k)}$ should belong to the space S, and therefore $\lambda_p^{(k)}$ and $\lambda_q^{(k)}$ can take only certain integer values. In particular, $\lambda_p^{(k)} \in A_p^{(k)}$, and $\lambda_p^{(k)} \in A_q^{(k)1}$. If $A_p$ is the M-PAM signal set, then $A_p^{(k)}$ $$A_p^{(k)} \triangleq \{x \mid (x + d_p^{(k)}) \in A_p, x \neq 0\}$$

and so is the definition for $A_q^{(k)}$. Here, $d_q^{(k)}$ refers to the pth symbol in the data vector d(k). For example, both 4-PAM and 16-QAM will have the same set $A_p = \{-3, -1, 3\}$ and if d(k) p is $-1$, then $A_p^{(k)} = \{-2, 2, 4\}$. Similar definitions can be obtained for non-square M-QAM signal sets as well. If the symbols were updated as given by (22), then using (7), we can write the cost difference function $$\Delta C_{p,q}^{(k+1)}(\lambda_p^{(k)}, \lambda_q^{(k)}) \triangleq C^{(k+1)} - C^{(k)}$$

as $$\Delta C_{p,q}^{k+1}(\lambda_p^{(k)}, \lambda_q^{(k)}) = \lambda_p^{(k)^2}(G)_{p,p} + \lambda_p^{(k)^2}(G)_{q,q} + 2\lambda_p^{(k)} \lambda_q^{(k)}(G)_{p,q} - 2\lambda_p^{(k)} z_p^{(k)} - 2\lambda_q^{(k)} z_q^{(k)}, \quad (23)$$

where $\lambda_p^{(k)} \in A_p^{(k)}$ and $\lambda_q^{(k)} \in A_q^{(k)}$. We can write this compactly $(\lambda_p^{(k)}, \lambda_q^{(k)}) \in A_{p,q}^{(k)}$ where $A_{p,q}^{(k)}$ denotes the Cartesian product of $A_p^{(k)}$ and $A_q^{(k)}$. For a given p and q, in order to decrease the ML cost function, we would like to choose a pair $(\lambda_p^{(k)}, \lambda_q^{(k)})$ such that $\Delta C_{p,q}^{k+1}$ given by (23) is negative. If multiple pairs exist for which $\Delta C_{p,q}^{k+1}$, is negative, we choose the pair which results in the most negative value of $\Delta C_{p,q}^{k+1}$. Unlike 1-symbol update, for 2-symbol update $\Delta C_{p,q}^{k+1}(\lambda_p^{(k)}, \lambda_q^{(k)})$ in (23) s a function of two discrete valued variables, and so we do not have a closed-form expression for $(\lambda_{p,opt}^{(k)}, \lambda_{q,opt}^{(k)})$. Consequently, a brute-force method is to evaluate $\Delta C_{p,q}^{k+1}(\lambda_p^{(k)}, \lambda_q^{(k)})$ over all possible values of $(\lambda_p^{(k)}, \lambda_q^{(k)})$, i.e., $$\left(\lambda_{p,opt}^{(k)}, \lambda_{q,opt}^{(k)}\right) = \underset{(\lambda_p^{(k)}, \lambda_q^{(k)}) \in A_{p,q}^{(k)}}{\operatorname{argmin}} \Delta C_{p,q}^{k+1}(\lambda_p^{(k)}, \lambda_q^{(k)}). \quad (24)$$

We denote the minimum value of $\Delta Ck+1$ $\Delta C_{p,q}^{k+1}(\lambda_p^{(k)}, \lambda_q^{(k)})$ obtained from the above minimization as $$\Delta C_{p,q,opt}^{k+1} \triangleq \Delta C_{p,q}^{k+1}(\lambda_{p,opt}^{(k)}, \lambda_{q,opt}^{(k)}). \quad (25)$$

The computational complexity in (24) $O(M^2)$ for M-PAM and O(M) for M-QAM. Approximate methods can be adopted to solve (24) using lesser complexity. One such method which can give closed-form expression for the solution is as follows. The cost difference function in (23) can be rewritten as $$\Delta C_{p,q}^{k+1}(\lambda_p^{(k)}, \lambda_q^{(k)}) = \Lambda_{p,q}^{(k)^T} F_{p,q} \Lambda_{p,q}^{(k)} - 2\Lambda_{p,q}^{(k)^T} Z_{p,q} \quad (26)$$

where $$\Lambda_{p,q}^{(k)} \triangleq [\lambda_p^{(k)} \lambda_q^{(k)}]^T \text{ and } Z_{p,q}^{(k)} \triangleq [z_p^{(k)} z_q^{(k)}]^{T1}.$$

Also $F_{p,q} \in R^{2\times 2}$: is the 2×2 sub-matrix of G containing only the elements in the pth and qth rows and columns. Therefore, $$(F_{p,q})_{1,1} \triangleq (G)_{p,p}, (F_{p,q})_{1,2} \triangleq (G)_{p,q}, (F_{p,q})_{2,1} \triangleq (G)_{q,p},$$

and $$(F_{p,q})_{2,2} \triangleq (G)_{q,q}.$$

Since $\Delta C_{p,q}^{k+1}(\lambda_p^{(k)}, \lambda_q^{(k)})$ is a strictly convex quadratic function (the Hessian $F_{p,q}$ is always positive definite), a unique global minima exists, and is given by $$\tilde{\Lambda}_{p,q}^{(k)} = F_{p,q}^{-1} z_{p,q}^{(k)} \qquad (27)$$

However, the solution given by (27) need not lie in $A_{p,q}^{(k)}$ and, therefore, we first round-off the solution to the nearest elements in $A_{p,q}$, where $A_{p,q}$ is the Cartesian product of $A_{p,q}$ and $A_p$. We do the rounding as follows $A_q$ $$\tilde{\Lambda}_{p,q}^{(k)} = 2[0.5\tilde{\Lambda}_{p,q}^{(k)}]$$

In (28), the operation is done element-wise since $\hat{\Lambda}_{p,q}^{(k)}$ is a vector. Further, let $$\left(\tilde{\lambda}_p^{(k)} \tilde{\lambda}_q^{(k)}\right)^T \hat{\Lambda}_{p,q}^{(k)} \triangleq .$$

It is possible that the solution $\hat{\Lambda}_{p,q}^{(k)}$ in (28) need not lie in $A_{p,q}^{(k)}$. This would result in $l_p^{(k+1)} \notin A_p$. For example, if $A_p$ is M-PAM, then $d_p^{(k+1)} \notin A_p$ if $d_p^{(k)} + \hat{\lambda} > (M-1)$. In such cases, we propose the following adjustment to $\hat{\lambda}_p^{(k)}$ $$\hat{\Lambda}_p^{(k)} = \begin{cases} (M-1) - d_p^{(K)}, \text{ when } \hat{\Lambda}_p^{(k)} + d_p^{(k)} > (M-1) \\ -(M-1) - d_p^{(K)}, \text{ when } \hat{\Lambda}_p^{(k)} + d_p^{(k)} < -(M-1). \end{cases} \qquad (29)$$

Similar adjustment is done for $\hat{\lambda}_q^{(k)}$ also. After these adjustments, we are guaranteed that $\hat{\lambda}_{p,q}^{(k)} \in A_{p,q}^{(k)}$. We can therefore evaluate the cost difference function value as $C_{k+1} \Delta C_{p,q}^{k+1}(\hat{\lambda}_p^{(k)}, \hat{\lambda}_q^{(k)})$ It is noted that the complexity of this approximate method does not depend on the size of the set $A_{p,q}^{(k)}$ i.e., it has constant complexity. Through simulations, we have observed that this approximation results in a performance close to that of the brute-force method. We define the optimum pairs, (r, s) from the brute-force method and (r̂, ŝ) from the approximate method, respectively, as $$(r, s) = \underset{(p, q)}{\arg\min} \Delta C_{p,q,opt}^{k+1}, \qquad (30)$$

and $$(\hat{r}, \hat{s}) = \underset{(p, q)}{\arg\min} \Delta C_{p,q}^{k+1}(\hat{\lambda}_p^{(k)}, \hat{\lambda}_q^{(k)}). \qquad (31)$$

The corresponding minimum values of the cost difference functions are given by $$\Delta C_{opt}^{k+1} \triangleq \Delta C_{r,s,opt}^{k+1}, \qquad (32)$$

and $$\Delta \hat{C}_{opt}^{k+1} \triangleq \Delta C_{\hat{r},\hat{s}}^{k+1}(\hat{\lambda}_r^{(k)}, \hat{\lambda}_s^{(k)}) \qquad (33)$$

The update rule for the z(k) vector is given by $$z^{(k+1)} = z^{(k)} - (\lambda_{r,opt}^{(k)} g_r + \lambda_{s,opt}^{(k)} g_s) \qquad (34)$$

$$d^{(k+1)} = d^{(k)} + \lambda_{r,opt}^{(k)} e_r + \lambda_{s,opt}^{(k)} e_s \qquad (35)$$

for the brute-force method, and $$z^{(k+1)} = z^{(k)} - (\hat{\lambda}_r^{(k)} g_r + \hat{\lambda}_s^{(k)} g_s) \qquad (36)$$

$$d^{(k+1)} = d^{(k)} + (\hat{\lambda}_r^{(k)} e_r + \hat{\lambda}_s^{(k)} e_s) \qquad (37)$$

for the approximate method. A similar procedure can be devised for the 3-symbol update as well. The 3-symbol update procedure is summarized in Appendix A. The overall algorithmic summary of the proposed M-LAS is given in Table-I. The complexity of the M-LAS algorithm can be shown to be $O(N_t N_r)$ per symbol, which is given in Appendix B.

BER Performance of M-LAS in V-BLAST

In this section, we present the uncoded and coded BER performance of the M-LAS detector in V-BLAST, evaluated through simulations for hard as well as soft decision M-LAS outputs.

Uncoded BER Performance

Figure 1:
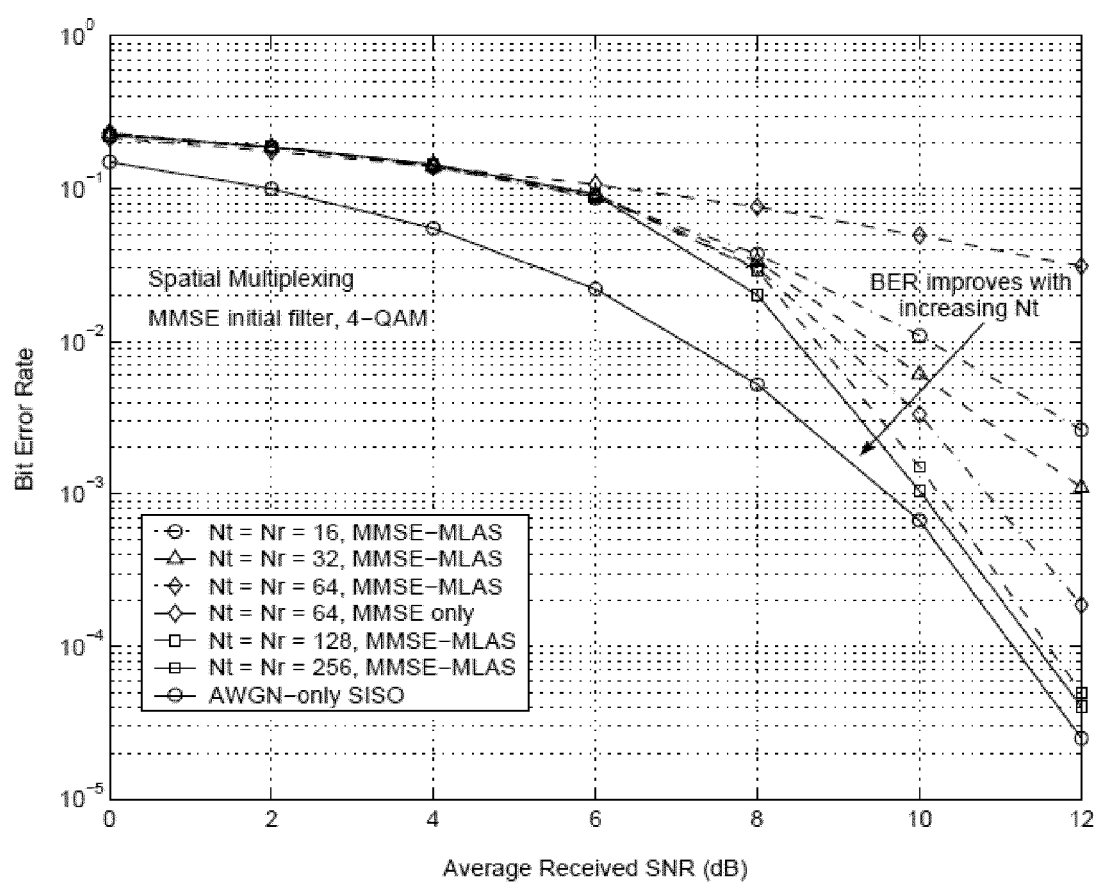

Performance for increasing $N_t = N_r$. In FIG. 1, we present the uncoded BER performance of the M-LAS detector for different values of $N_t = N_r$ and 4-QAM. MMSE filter is used as the initial filter. We label the M-LAS detector with MMSE initial filter as 'MMSEMLAS' in all the figures. MMSE filter (without M-LAS) performance as well as AWGN only (without fading) SISO performance are also plotted for comparison. Perfect knowledge of the channel coefficients is assumed at the receiver in the simulations (this assumption will be relaxed in later coded BER simulations). From FIG. 1, it can be observed that the performance of the proposed MMSE-MLAS improves with increasing $N_t = N_r$, such that for $N_t = N_r = 64$ it achieves an uncoded BER of $10^{-3}$ at just 1 dB away from the SNR required in a AWGN-only SISO system with 4-QAM. With $N_t = N_r = 128$ and 256, the MMSEMLAS performance moves even closer to the AWGN-only SISO performance (to within 0.5 dB) This is an impressive result which illustrates the ability of the proposed MMSE-MLAS to achieve single-antenna, no-fading, AWGN performance in a large multi-antenna fading scenario, essentially removing 'almost' all the spatial interference from other antennas.

Figure 2:
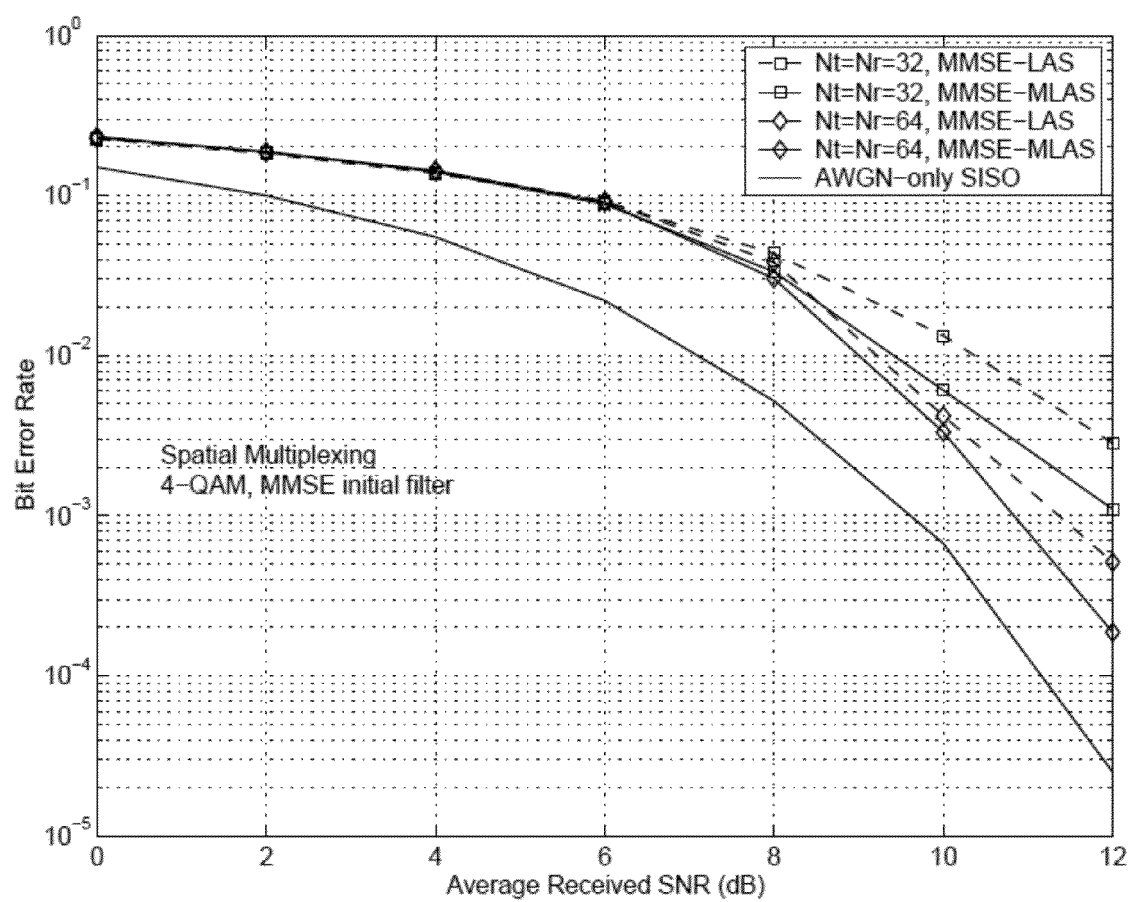

M-LAS versus LAS: it is pointed out that the LAS detector presented in reference [9], [10] also achieves near AWGN-only SISO performance, but only when the number of antennas is of the order of hundreds. Whereas, a key advantage of the present M-LAS detector is that it is able to achieve near AWGN-only SISO performance even with tens of antennas e.g., $N_t = N_r = 64$. This observation is illustrated in FIG. 2, where we compare the uncoded BER performance of the MMSE-MLAS with that of the MMSE-LAS in reference [9],[10] (i.e., LAS with MMSE initial filter), for $N_t = N_r = 64$, 32 and 4-QAM. It can be seen that MMSE-MLAS outperforms MMSELAS. This performance improvement is due to the 2- and 3-symbol updates performed in MLAS, in addition to the 1-symbol updates performed in LAS. As we pointed out earlier, the 2- and 3-symbol updates in M-LAS increase the complexity a little, but the average per-symbol complexity (defined as total complexity divided by the total number of complex symbols, Nt) still remains as $O(N_t N_r)$ as illustrated in Appendix B. Also, the performance advantage of M-LAS over LAS in the regime of tens of antennas has interesting practical implications, since tens of antennas can be placed in moderately sized communication terminals (e.g., laptops, set top boxes) which can enable large MIMO systems to be viable in practice.

Nearness to Capacity/Turbo Coded Performance

Figure 3:
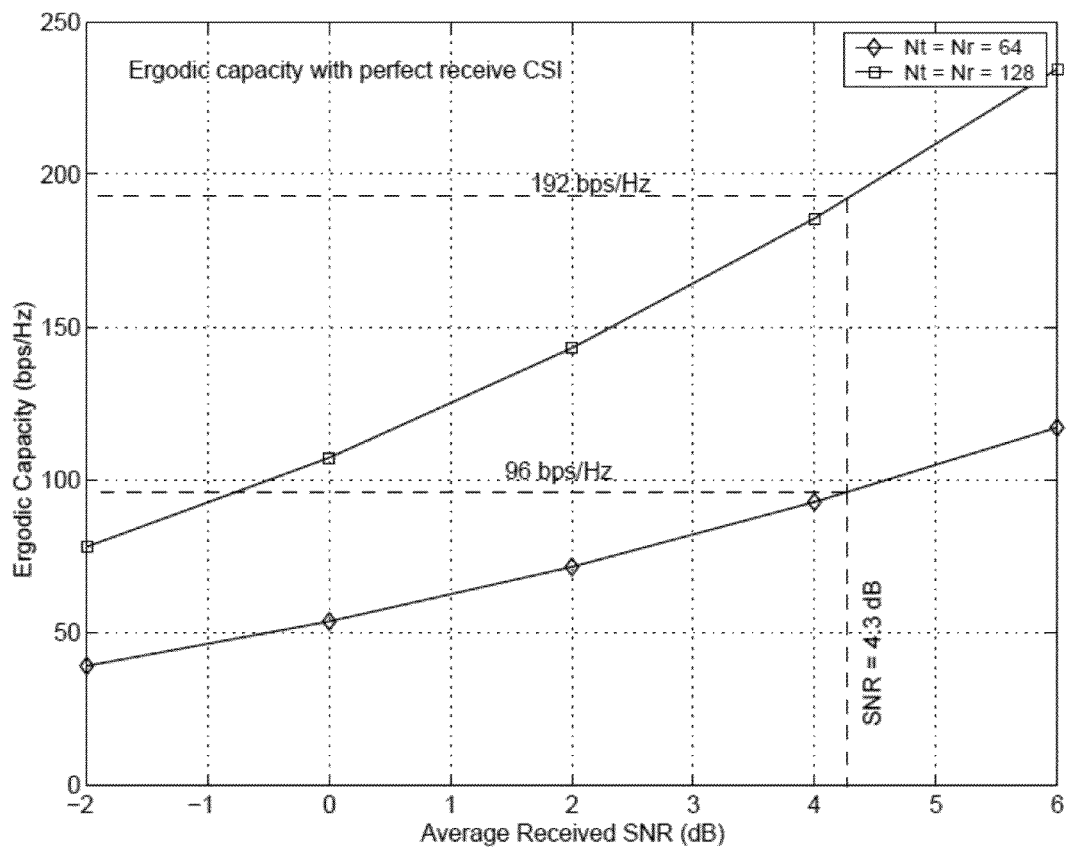

We next evaluated the coded BER performance of the M-LAS detector with a focus on establishing its nearness to theoretical MIMO capacity. For a $N_t \times N_r$ MIMO system model in Sec. 2 with perfect channel state information (CSI) at the receiver, the ergodic capacity is given by [5]

$$C = E[\log \det(I_{N_r} + (\gamma/N_t) HH^H)], \quad (38)$$

where $I_{N_r}$ is the $N_r \times N_r$ identity matrix and $\gamma$ is the average SNR per receive antenna. In FIG. 3, we plot the capacity curves for 64×64 and 128×128 MIMO systems evaluated through Monte-Carlo simulations. It can be seen that the minimum SNRs required to achieve a capacity of 96 bps/Hz in a 64×64 system and 192 bps/Hz in a 128×128 system are both 4.3 dB. We consider two practical MIMO system designs that use a rate-¾ turbo code and 4-QAM; one having a spectral efficiency of 96 bps/Hz by using 64×64 V-BLAST, and another having a spectral efficiency of 192 bps/Hz by using 64×64V-BLAST. In both these systems, we establish how close the M-LAS detector's performance can go near the theoretical capacity; these results are explained herein below (shown in FIGS. 4 and 5).

Generation of Soft Outputs

A method for generating soft output from M-LAS is proposed. Generating soft values at the M-LAS output for all the individual bits that constitute the modulation symbols (M-PAM/M-QAM) mounted on all the transmit antennas as follows. These soft output values are then fed as inputs to the turbo decoder. Let $d=[\hat{x}1, \hat{x}2, \ldots, \hat{x}2N_t]$, $\hat{x}_i \in A_i$ denote the detected output vector from the M-LAS algorithm. Let $\hat{x}_i$ map to the bit vector $b = b_{i,1}, b_{i,2}, \ldots, b_i, k_i]^T$, where $K_i = \log_2 |A_i|$, and $b_{ij} \in \{+1, -+\}$ $i=1, 2, \ldots 2N_t$ and $j=1, 2, \ldots K_i$ $\tilde{b}_{ij} \in i$ denote the soft value for the jth bit of the ith symbol. Given $d$, we need to find $\tilde{b}_{i,j}$, $\forall(i,j)$. Now, define vectors $b_i^{j+}$ and $b_i^{j-}$ to be the $b_i$ vector with its jth entry forced to $+1$ and $-1$, respectively. Let $b_i^{j+}$ and $b_i^{j-}$ demap to $x_i^{j+}$ and $b_i^{j-}$ respectively, where $x_i^{j+}$, $x_i^{j-} \in A_i$ Also, define vectors $d_i^{j+}$ and $d_i^{j-}$ to be the $d$ vector with its ith entry forced to $x_i^{j+}$ and $x_i^{j-}$ respectively. Using the above definitions, we obtain the soft output value for the jth bit of the ith symbol as $$\tilde{b}_{i,j} = \frac{\|y - Hd_i^{j-}\|^2 - \|y - Hd_i^{j+}\|^2}{\|b_i\|^2}. \quad (39)$$

The RHS of the above equation can be efficiently computed in terms of the known variables $z$ and $G$ as follows. Since $d_j^{i+}$ and $d_j^{i-}$ differ only in the ith entry, we can write $$d_j^{i-} = d_j^{i+} + \lambda_{i,j} e_i. \quad (40)$$

Since we know $d_j^{i-}$ and $d_j^{i+}$, we know $\lambda_{ij}$, from (40). Substituting (40) in (39), we can write $$\tilde{b}_{i,j} \|h_i\|^2 = \|y - Hd_i^{j+} - \lambda_{i,j} h_i\|^2 - \|y - Hd_i^{j+}\|^2$$

$$= \lambda_{i,j}^2 \|h_i\|^2 - 2\lambda_{i,j} h_i^T (y - Hd_i^{j+}) \quad (41)$$

$$= -\lambda_{i,j}^2 \|h_i\|^2 - 2\lambda_{i,j} h_i^T (y - Hd_i^{j-}). \quad (42)$$

If $b_i^j = 1$, then $d_j^{i+} = d$, and substituting this in (41) and dividing by $\|h_i\|^2$, we get $$\tilde{b}_{i,j} = \lambda_{i,j}^2 - 2\lambda_{i,j} \frac{z_i}{(G)_{i,i}}. \quad (43)$$

On the other hand, if $b_i^j = -1$, then $d_j^i = d$, and substituting this in (42) and dividing by $\|h_i\|^2$, we get $$\tilde{b}_{i,j} = -\lambda_{i,j}^2 - 2\lambda_{i,j} \frac{z_i}{(G)_{i,i}}. \quad (44)$$

It is noted that $z$ and $G$ are already available upon the termination of the M-LAS algorithm, and hence the complexity of computing $b_{ij}$ in (43) and (44) is constant. Hence, the overall complexity in computing the soft values for all the bits is $O(N_t \log_2 M)$. It is observed from (43) and (44) that the magnitude of $b_{ij}$ depends upon $\lambda_{ij}$. For large size signal sets, the possible values of $\lambda_{i,j}$ will also be large in magnitude. Therefore $b_{ij}$ has to be normalized for the turbo decoder to function properly. It has been observed through simulations that normalizing $b_{ij}$ by $$\left(\frac{\lambda_{i,j}}{2}\right)^2$$

resulted in good performance.

Turbo Coded BER Results

Figure 4:
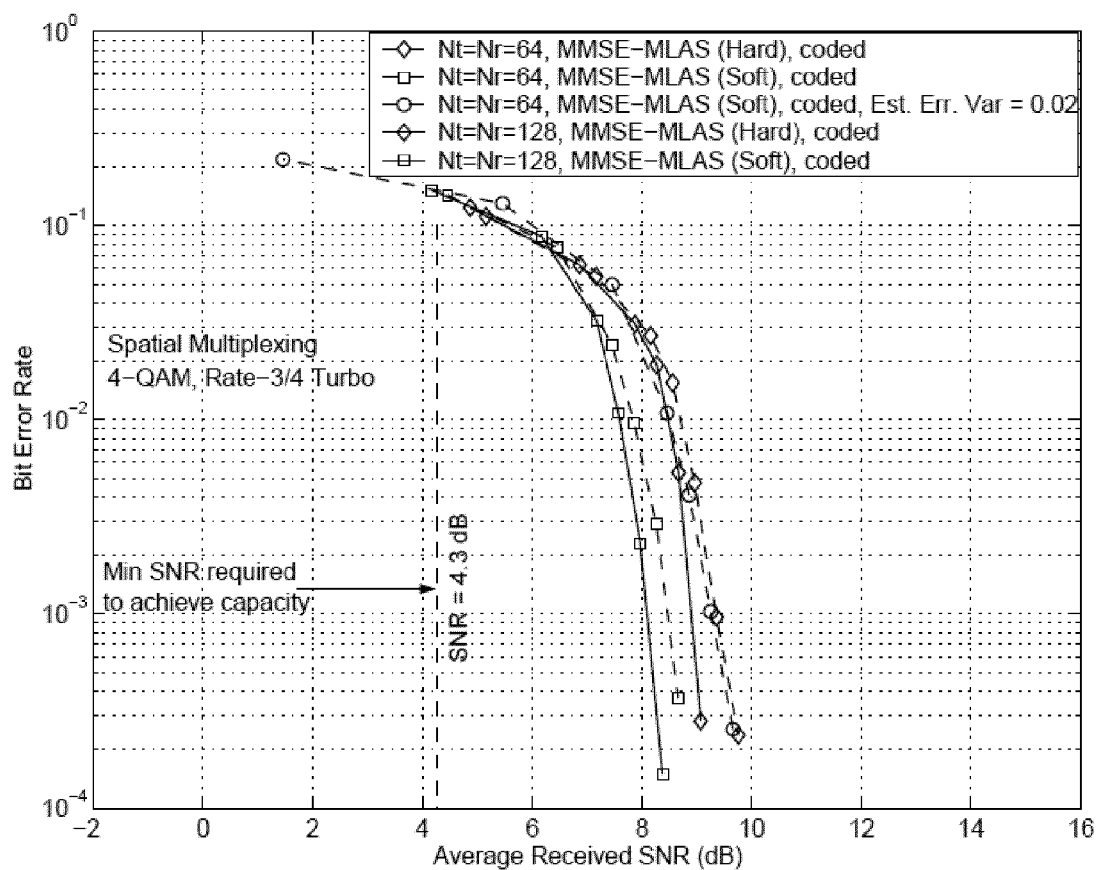
Figure 5:
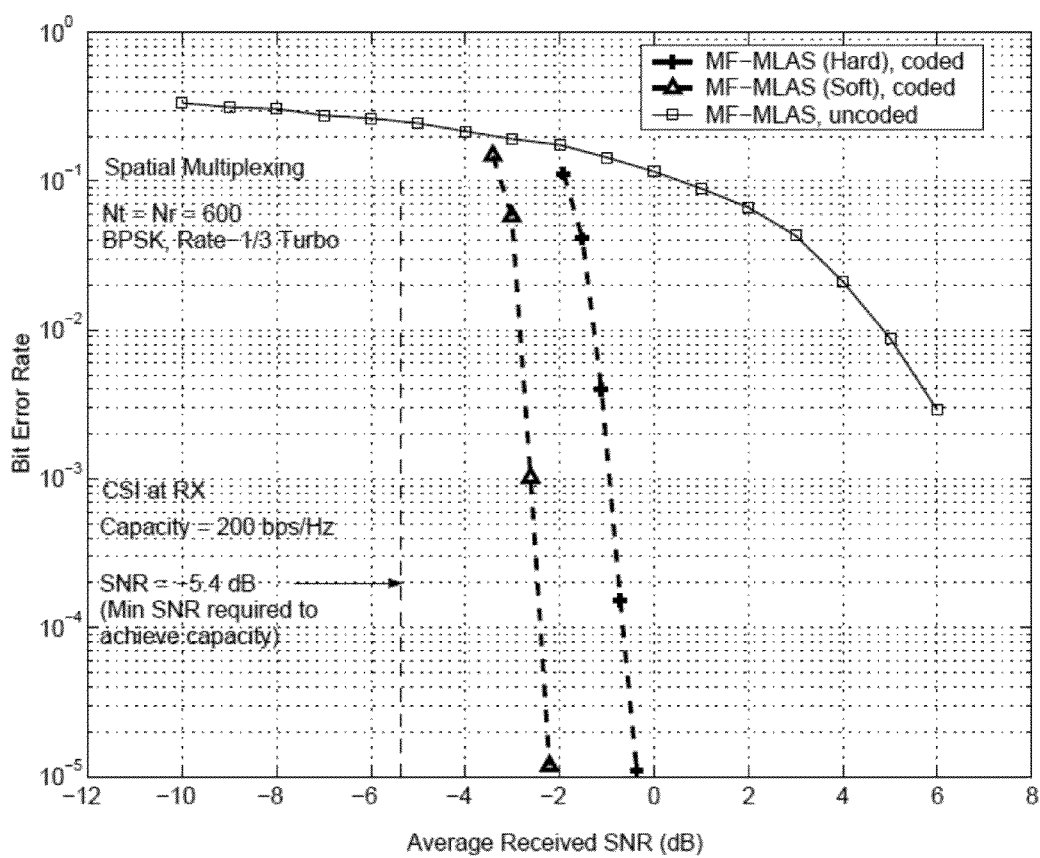

FIG. 4 shows the rate-¾ turbo coded BER performance of the proposed M-LAS detector for $N_t = N_r = 64$, 128, 4-QAM and MMSE initial vector. It is also shown the minimum SNR limit of 4.3 dB required to achieve theoretical capacity. Turbo coded BER plots for hard decision as well as soft decision M-LAS outputs are shown. It can be observed that with hard decision input to the turbo decoder, the M-LAS detector for 64×64 V-BLAST performs close to within about 6 dB from the theoretical capacity. With the proposed soft decision inputs, it performs close to within about 4.5 dB from theoretical capacity. In a 128×128 V-BLAST system, the M-LAS detector is found to perform close to within about 4 dB and 5.5 dB from theoretical capacity for soft decision and hard decision, respectively, which is an impressive result from a nearness to capacity viewpoint. Further, FIG. 5 shows the uncoded and rate-⅓ turbo coded BER performance of the M-LAS detector with hard and soft decision for $N_t = N_r = 600$, MF initial filter and BPSK. (For such large number of antennas, the performance of M-LAS and LAS with MF, ZF, and MMSE initial vectors are almost the same, since, in this case, the near-ML performance point will be reached in the first search stage with 1-symbol update itself, and therefore 2- and 3-symbol updates will be less likely to further increase the likelihood. Also, the matrix inversion involved in the MMSE/ZF initial filters can be avoided if MF is used instead) It can be seen that M-LAS with soft decision performs close to within just about 3.2 dB from theoretical IMO capacity. This is by far the best nearness to capacity result reported with a practical low-complexity detector in a large MIMO system with such large number of antennas.

Effect of Channel Estimation Errors: The effect of channel estimation errors on the performance of the M-LAS detector is evaluated. Considering a channel estimation error model where the estimated channel matrix, $\hat{H}$, is taken to be $\hat{H} = H + \Delta H$, where $\Delta H$ is the estimation error matrix, the entries of which are assumed to be i.i.d. complex Gaussian with zero mean and variance $0^{-2}_e$. In FIG. 4, also plotted the coded BER performance of the M-LAS detector with soft decision for 64×64 V-BLAST with a channel estimation error variance of $0^{-2}_e = 0.02$. It can be observed that the loss in coded BER performance is only about 1 dB compared to the case of perfect channel estimates, indicating the robustness of the M-LAS to channel estimation errors. Along this line, low-complexity channel estimation algorithms and their performance in large MIMO systems are being investigated as further extension to this work.

Decoding of STBCs from DA Using M-LAS

High-rate, non-orthogonal STBC$_s$ (an STBC is represented by a p×N$_t$ matrix with complex entries, where N$_t$ and p denote the number of transmit antennas and time slots, respectively. Rate of an STBC, r, is defined as r=k/p, where k and p denote the number of complex symbols sent and number of time slots, respectively, in one STBC matrix) from Division Algebras (DA) in reference [15] are attractive for achieving high spectral efficiencies in addition to achieving full transmit diversity, using large number of transmit antennas. Well known orthogonal STBCs have the advantages of low decoding complexity and full transmit diversity, but suffer from rate loss for increasing number of transmit antennas as in reference [2], [17], [18], [19]. Non-orthogonal STBCs which achieve full-rate can be constructed from DA for arbitrary number of transmit antennas, n, using the following construction [15]: (An n×n STBC is said to be full-rate if the number of complex symbols transmitted per channel use is equal to min (N$_t$,N$_r$). For example, the well known Alamouti code as in reference [17] is of full-rate when received with one antenna and not of full-rate when received with more than one antenna)

contribution in this disclosure is that we have successfully adopted the proposed M-LAS algorithm to decode large STBCs (the STBC received signal model in an equivalent V-BLAST form, and apply the M-LAS algorithm on this equivalent signal model) from DA, and show that the algorithm achieves near capacity performance with low decoding complexity for large n.

BER Performance of STBCs from DA

Figure 6:
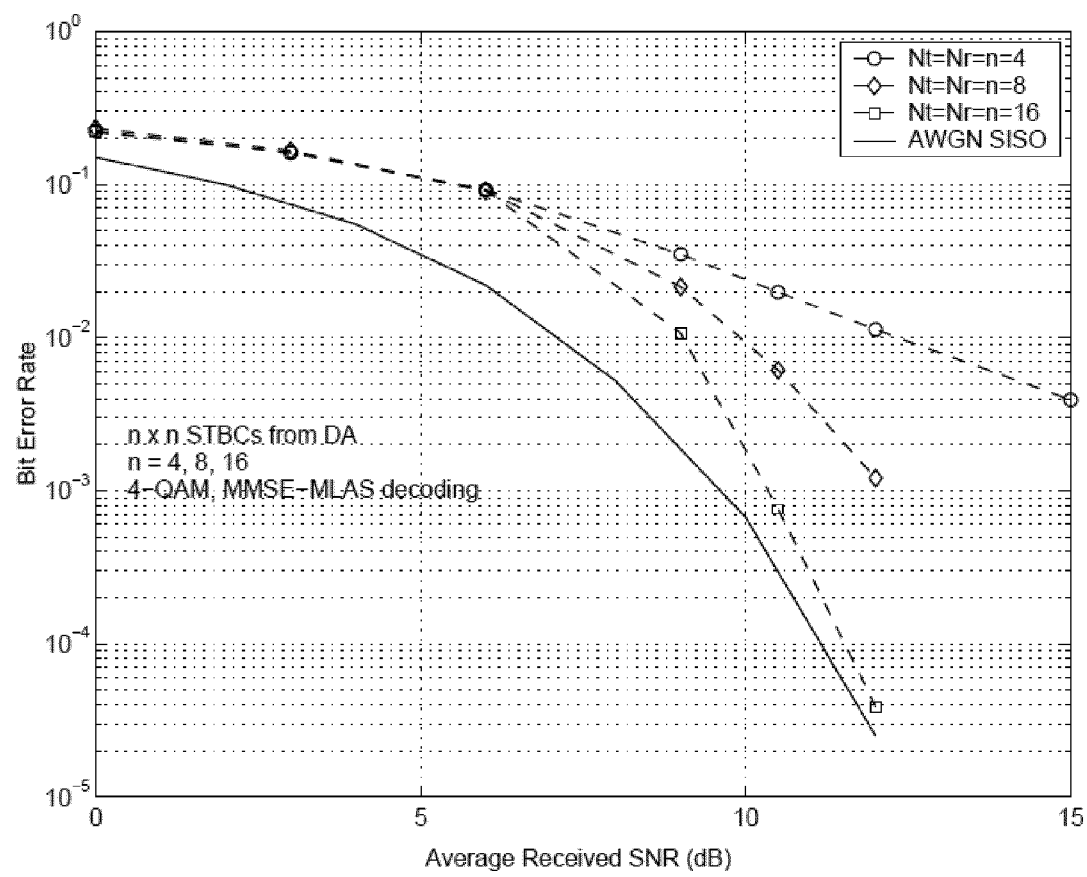
FIG. 6 shows uncoded BER performance of the proposed M-LAS detector in decoding n×n full-rate non-orthogonal STBCs from DA in (45) for n=4, 8, 16. MMSE initial filter, 4-QAM, $N_t=N_r=n$. 16×16 code with 16 antennas and 256 complex symbols in each code matrix achieves close to AWGN-only (no fading) SISO performance.

Uncoded BER Performance: In FIG. 6, we present the uncoded BER performance of the M-LAS detector in decoding n×n full-rate, non-orthogonal STBCs from DA in (45) for n=4, 8, 16 and 4-QAM. It can be observed that as the STBC code size n increases, the M-LAS performs increasingly better such that it achieves close to AWGN-only SISO performance (within 0.5 dB at $10^{-3}$ BER and less) with the 16×16 STBC having 256 complex symbols in it. We emphasize that due to the high complexities involved in decoding large size STBCs using other known detectors, the BER performance of STBCs with large n has not been reported in the literature so far. The very fact that we could show the simulated BER plots (both uncoded as well as turbo coded) for a 16×16 STBC with 256 complex symbols in one code matrix in itself is a clear indication of the superior low-complexity attribute of the proposed M-LAS algorithm. To our knowledge, we are probably the first to report the simulated BER performance of a 16×16 STBC from DA; this became feasible because of the $$\begin{bmatrix} \sum_{i=0}^{n-1} x_{0,i}t^i & \delta\sum_{i=0}^{n-1} x_{n-1,i}w_n^i t^i & \delta\sum_{i=0}^{n-1} x_{n-2,i}w_n^{2i} t^i & \dots & \delta\sum_{i=0}^{n-1} x_{1,i}w_n^{(n-1)i} t^i \\ \sum_{i=0}^{n-1} x_{1,i}t^i & \sum_{i=0}^{n-1} x_{0,i}w_n^i t^i & \delta\sum_{i=0}^{n-1} x_{n-1,i}w_n^{2i} t^i & \dots & \delta\sum_{i=0}^{n-1} x_{2,i}w_n^{(n-1)i} t^i \\ \sum_{i=0}^{n-1} x_{2,i}t^i & \sum_{i=0}^{n-1} x_{1,i}w_n^i t^i & \delta\sum_{i=0}^{n-1} x_{0,i}w_n^{2i} t^i & \dots & \delta\sum_{i=0}^{n-1} x_{3,i}w_n^{(n-1)i} t^i \\ \vdots & \vdots & \vdots & & \vdots \\ \sum_{i=0}^{n-1} x_{n-2,i}t^i & \sum_{i=0}^{n-1} x_{n-3,i}w_n^i t^i & \sum_{i=0}^{n-1} x_{n-4,i}w_n^{2i} t^i & \dots & \delta\sum_{i=0}^{n-1} x_{n-1,i}w_n^{(n-1)i} t^i \\ \sum_{i=0}^{n-1} x_{n-1,i}t^i & \sum_{i=0}^{n-1} x_{n-2,i}w_n^i t^i & \sum_{i=0}^{n-1} x_{n-3,i}w_n^{2i} t^i & \dots & \sum_{i=0}^{n-1} x_{0,i}w_n^{(n-1)i} t^i \end{bmatrix},$$ (45)

where n is an integer, $$\omega_n = e^{\frac{j2\pi}{n}}, j = \sqrt{-1}, \text{ and } x_{u,v}, 0 \le u, v \le n-1$$

are the data symbols from a QAM alphabet. When $\delta=e^{\sqrt{5}j}$ and $t=e^j$, the code in (45) achieves full transmit diversity (under ML decoding) as well as information-losslessness [15]. When $\delta=t=1$, the code ceases to be of full-diversity, but continues to be information-lossless, reference [16]. High spectral efficiencies with large n can be achieved using the above code construction. For example, with n=16 transmit antennas, the 16×16 STBC from (45) with 4-QAM and rate-¾ turbo code achieves a high spectral efficiency of 24 bps/Hz. This high spectral efficiency is achieved along with the full-diversity of order nN$_r$. However, since the code is non-orthogonal, ML decoding gets increasingly impractical for large n (there are $n^2$ symbols in a code matrix). Consequently, a key challenge in realizing the benefits of these large DA codes in practice is that of achieving near-ML performance for large n at low decoding complexities. In this context, a significant low-complexity feature of the proposed M-LAS algorithm. In addition, the achievement of near-AWGN SISO performance with 16×16 STBC is a significant result from an implementation view point as well, since 16 antennas can be easily placed in communication terminals of moderate size, which can make large MIMO systems practical.

Figure 7:
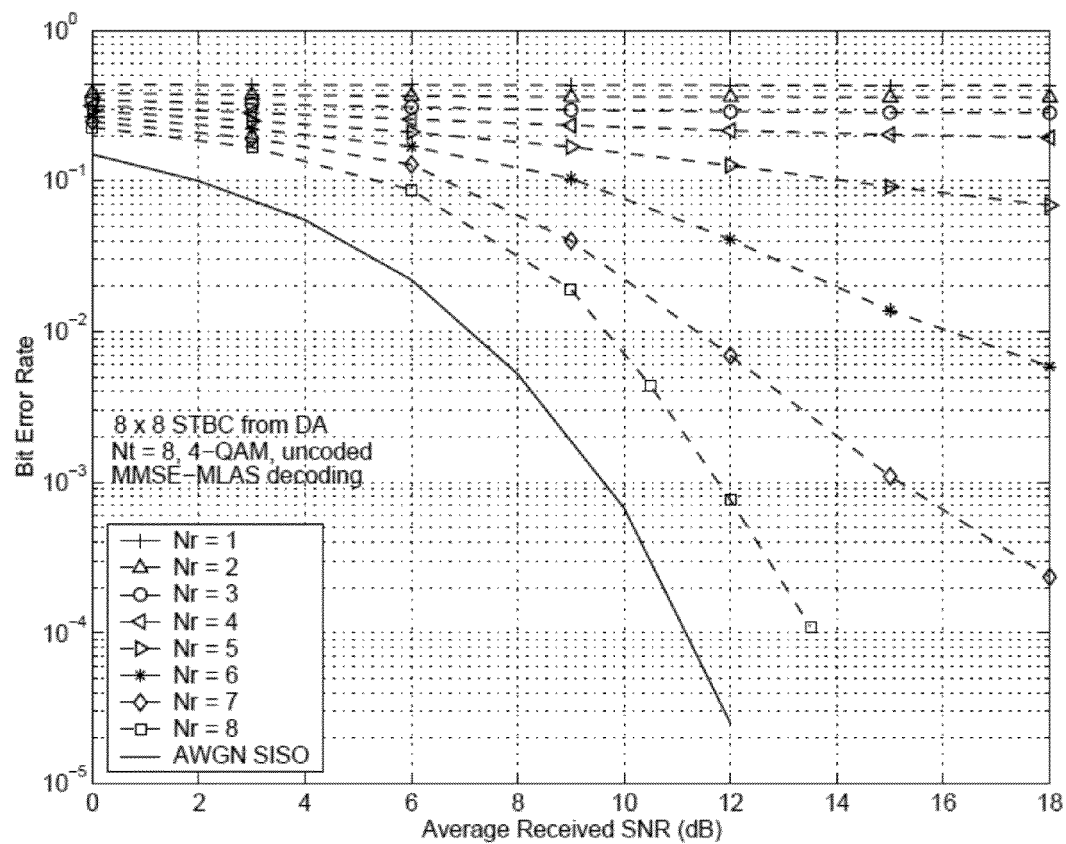
FIG. 7 shows uncoded BER performance of the proposed M-LAS detector in decoding 8×8 full-rate non-orthogonal STBCs from DA in (45) for different number of receive antennas, Nr=1, 2, . . . , 8. MMSE initial filter, 4-QAM.
Figure 8:
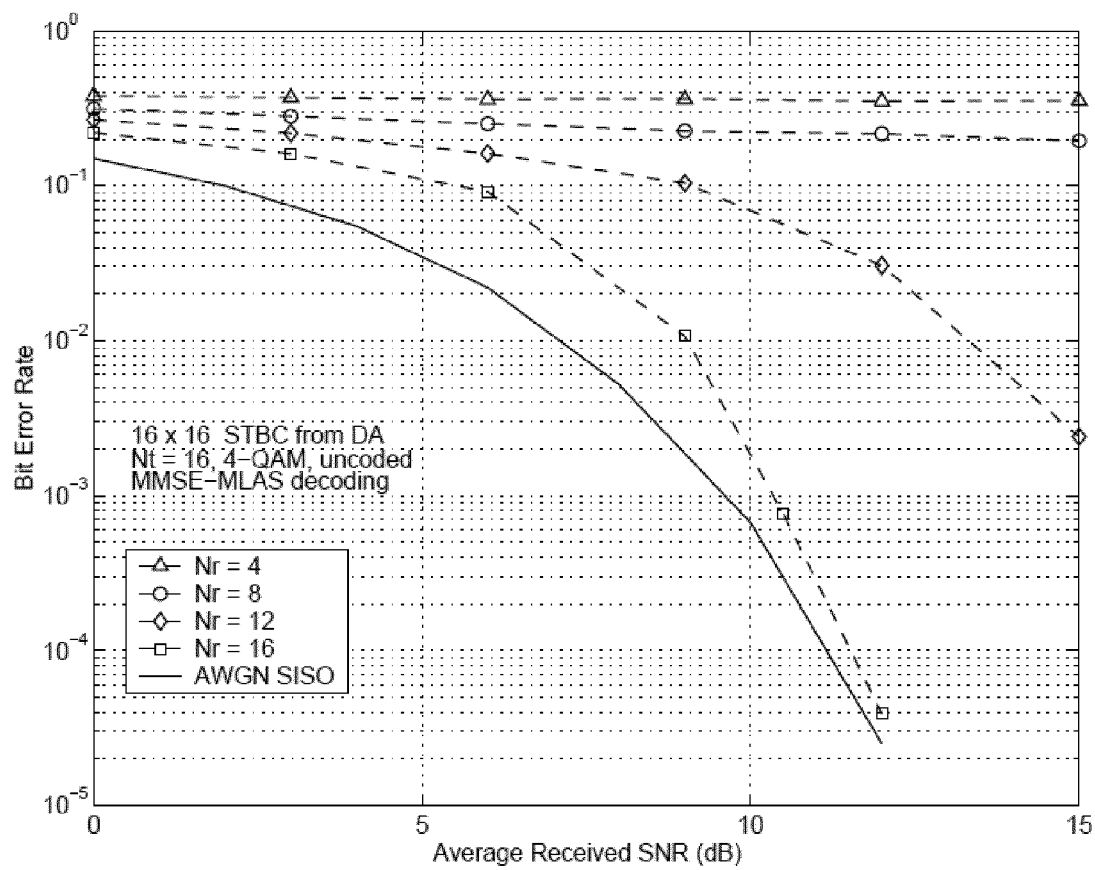
FIG. 8 shows uncoded BER performance of the proposed M-LAS detector in decoding 16×16 full-rate non-orthogonal STBCs from DA in (45) for different number of receive antennas, $N_r$. MMSE initial filter, 4-QAM.

Large Asymmetric MIMO Architecture: Large asymmetric MIMO systems where the transmitter and receiver have unequal number of transmit and receive antennas are of interest. For example, the base station (BS) with a lesser constraint on terminal size and cost can be provided with a larger number of transmit antennas, while a more cost/space constrained user terminal can use fewer number of receive antennas. This asymmetric architecture can reduce the cost and hardware complexity at the user terminals. Note that such an asymmetric approach has been provided for in the IEEE 806.16e standards; e.g., 4 transmit antennas at the BS and 2 receive antennas at the user terminal. We point out that, with the availability of the proposed low-complexity M-LAS algorithm for decoding large size STBCs, asymmetric STBC MIMO systems with even larger number of antennas can be made possible (e.g., 16 transmit antennas at the BS employing a 16×16 STBC, and 12 receive antennas at the user terminals). The advantage of this large asymmetric STBC MIMO approach is that we can achieve high spectral efficiencies (by way of using a large size non-orthogonal STBC, and hence large number of transmit antennas at the BS), while keeping the cost and hardware complexity at the user terminal low (by way of using fewer number of receive antennas at the user terminal). To illustrate this point, in FIG. 7, we show the uncoded BER plots for the 8×8 STBC from DA decoded using the M-LAS algorithm for different number of receive antennas, $N_r=1, 2, \ldots, 8$. It can be seen that $N_r=8$ achieves a BER performance close to within 2 dB of the AWGN-only SISO performance. The M-LAS detector achieves reasonably good performance even for $N_r=7$ indicating its ability to perform reasonably well even with slightly lesser number of receive antennas. With an outer turbo code, the coded BER with $N_r=7$ could be acceptable, though not as good as that for $N_r=8$. This can allow a useful tradeoff between cost/complexity versus performance at the user terminal. FIG. 8 shows a similar uncoded BER plot for the 16×16 STBC in (45) for different values of $N_r$.

Turbo Coded BER Performance:

FIG. 9 shows the uncoded as well as rate-½ turbo coded BER performance of the 4×4 STBC from DA in (45) with $N_r=4$ and 4-QAM at a spectral efficiency of 4 bps/Hz. The minimum SNR required to achieve capacity in this system (1.2 dB) is also shown. From FIG. 9, we can see that the proposed M-LAS with soft decision achieves a performance close to within about 1 dB of the theoretical capacity. In FIG. 10, we show the coded BER performance for the 16×16 STBC using different turbo code rates of ⅓, ½, and ¾. With 4-QAM, these turbo code rates along with the 16×16 STBC in (45) correspond to spectral efficiencies of 10.6 bps/Hz, 16 bps/Hz and 24 bps/Hz, respectively. The minimum SNRs required to achieve these capacities are also shown in FIG. 10. It can be observed that the proposed M-LAS with soft decision performs to within about 4 to 4.5 dB of the theoretical capacity. Such nearness to capacity is a remarkable result from a theoretical view point, in addition to the low-complexity attribute of the M-LAS being remarkable from a large MIMO implementation view point. We further point out that although performance results are presented here only for n×n square STBC designs, the M-LAS algorithm can efficiently decode large $n_1 \times n_2$, $n_1 \neq n_2$ rectangular non-orthogonal STBC designs.

On V-BLAST Versus STBC Approach for Large MIMO

We point out that while the V-BLAST approach in large MIMO is attractive in terms of high spectral efficiency, large MIMO systems employing high-rate, non-orthogonal STBCs are quite attractive for practical implementation for the following reasons:

1. Number of transmit/receive antennas and IF/RF chains can be quite less in an STBC approach than in the spatial multiplexing (V-BLAST) approach; this can significantly reduce the hardware complexity and cost of the communication terminal,
2. Fewer channel coefficients need to be estimated in an STBC approach than in the VBLAST approach; for example, with an n×n STBC and one receive antenna (with quasi-static fading) only n fade coefficients need to be estimated, whereas in an n transmit and n receive antenna V-BLAST system, the number of fade coefficients to be estimated is $n^2$ which would require a more elaborate pilot symbols design and increased pilot power resulting in increased loss in throughput,
3. Availability of transmit diversity and coding gains in the STBC approach allows one to get much closer to capacity than the V-BLAST approach, and
4. Feasibility of an asymmetric MIMO architecture with the STBC approach, where large numbers of antennas are provided at the BS and fewer antennas at the user terminal, can reduce the hardware complexity and cost of the user terminal. For example, a 32×32 STBC from DA with 32 transmit antennas at the BS and 24 antennas at the user terminal could be practical; with 4-QAM and rate-¾ turbo code this system will offer a spectral efficiency of 48 bps/Hz.

The drawbacks with the STBC approach are the decoding delays and the quasi-static fading assumption. In indoor channels (e.g., in environments where systems like IEEE 802.11n operate) and fixed wireless channels (e.g., IEEE 802.16 fixed wireless standard), the channel coherence times are typically large for the quasi-static fading assumption to be valid.

Rectangular non-orthogonal STBCs with more number of transmit antennas than the number of time slots could be devised to alleviate the decoding delay issue while retaining high spectral efficiencies; the proposed M-LAS could be employed in decoding of such rectangular non-orthogonal STBCs as well.

Conclusions

The instant disclosure provides a low-complexity M-LAS algorithm for detection/decoding in large MIMO systems including V-BLAST as well as high-rate non-orthogonal STBCs from division algebras with tens of transmit/receive antennas. The proposed M-LAS algorithm was shown to have excellent features in terms of both low complexity as well as nearness to capacity performance. We believe that with the availability of low-complexity detectors (like the proposed M-LAS), large MIMO systems using V-BLAST and high-rate STBCs with large number of antennas will become practical, enabling interesting spectrally efficient high data rate wireless applications (e.g., wireless IPTV). Issues in channel estimation, pilot symbols allocation, and antenna/RF technologies in the large MIMO context are being investigated. Given that 4 antenna systems are already defined in the current wireless standards like IEEE 802.11n and IEEE 802.16e, the proposed M-LAS algorithm has good potential for application in practical wireless standards.

APPENDIX A

3-Symbol Update Procedure

In this appendix, we present the 3-symbol update procedure in the proposed M-LAS algorithm. Let us assume that we update the pth, qth and rth symbols in the (k+1)th iteration; p, q and r can take values from $1, \ldots, N_t$ for M-QAM and $1, \ldots, 2N_t$ for M-QAM. As in the case of 2-symbol update, the update rule for 3-symbol update can be written as $$d^{(k+1)} = d^{(k)} + \lambda_p^{(k)} e_p + \lambda_q^{(k)} e_q + \lambda_r^{(k)} e_r \qquad (46)$$

For any iteration k, $d^{(k)}$ should belong to the signal space S, and therefore $\lambda_p^{(k)}$, $\lambda_q^{(k)}$, and $\lambda_r^{(k)}$ can take only certain integer values. In particular, $\lambda_p^{(k)} \in A_p^{(k)}$, $\lambda_p^{(k)} \in A_q^{(k)} \in A_r^{(k)}$. If Ap is the M-PAM signal set, then $$A_p^{(k)} \triangleq \{x | x \in A_D, x \neq 0, |(x + d_p^{(k)})| \leq (\sqrt{M} - 1)\},$$

and so is the definition for $A_q^{(k)}$ and $A_r^{(k)}$. Similarly, if $A_p$ is square M-QAM signal set, then $$A_p^{(k)} \triangleq \{x | x \in A_p, x \neq 0, |(x + d_p^{(k)})| \leq (\sqrt{M} - 1)\},$$

and so is the definition for $A_q^{(k)}$ and $A_r^{(k)}$. Similar definitions can be obtained for non-square M-QAM signal sets as well.

If the symbols were updated as given by (46), we can write the cost difference function $$\Delta C_{p,q,r}^{k+1}(\lambda_p^{(k)}, \lambda_q^{(k)}, \lambda_r^{(k)}) \triangleq C^{(k+1)} - C^{(k)} \text{ as } \Delta C_{p,q,r}^{k+1}(\lambda_p^{(k)}, \lambda_q^{(k)}, \lambda_r^{(k)}) = \quad (47)$$
$$\lambda_p^{(k)^2}(G)_{p,p} + \lambda_q^{(k)^2}(G)_{q,q} + \lambda_r^{(k)^2}(G)_{r,r} + 2\lambda_p^{(k)}\lambda_q^{(k)}(G)_{p,q} +$$
$$2\lambda_p^{(k)}\lambda_r^{(k)}(G)_{p,r} + 2\lambda_q^{(k)}\lambda_r^{(k)}(G)_{q,r} - 2\lambda_p^{(k)}z_p^{(k)} - 2\lambda_q^{(k)}z_q^{(k)} - 2\lambda_r^{(k)}z_r^{(k)}.$$

As before, $\lambda_p^{(k)} \in A_p^{(k)}$, $\lambda_q^{(k)} \in A_q^{(k)}$, and $\lambda_r^{(k)} \in A_r^{(k)i}$, and which can be compactly written as $(\lambda_p^{(k)}, \lambda_q^{(k)}, \lambda_r^{(k)}) \in A_{p,q,r}^{(k)}$ where $\in A_{p,q,r}^{(k)}$ denotes the Cartesian product of $A_p^{(k)}, A_q^{(k)}$, and $A_r^{(k)}$. For the ML cost function to decrease, we would like to choose a 3-tuple $(\lambda_p^{(k)}, \lambda_q^{(k)}, \lambda_r^{(k)})$ such that $\lambda C_{p,q,i}^{k+1}$ given by (47) is negative. If multiple 3-tuples exist for which $\Delta C_{p,q,r}^{k+1}$ is negative then we choose the 3-tuple which results in the most negative value of $\Delta C_{p,q,r}^{k+1}$.

For 3-symbol update, $\Delta C_{p,q,r}^{k+1}(\lambda_p^{(k)}, \lambda_q^{(k)}, \lambda_r^{(k)})$ is a function of three discrete-valued variables. As in the case of 2-symbol update, here also we have a brute-force method as well as an approximate method to minimize $\Delta C_{p,q,r}^{k+1}(\lambda_p^{(k)}, \lambda_q^{(k)}, \lambda_r^{(k)})$ over $A_{p,q,r}^{(k)}$. The brute-force solution is given by $$(\lambda_{p,opt}^{(k)}, \lambda_{q,opt}^{(k)}, \lambda_{r,opt}^{(k)}) = \arg\min_{(\lambda_p^{(k)}, \lambda_q^{(k)}, \lambda_r^{(k)}) \in A_{p,q,r}^{(k)}} \Delta C_{p,q,r}^{k+1}(\lambda_p^{(k)}, \lambda_q^{(k)}, \lambda_r^{(k)}). \quad (48)$$

We denote the minimum value of the $\Delta C_{p,q,r}^{k+1}(\lambda_p^{(k)}, \lambda_q^{(k)}, \lambda_r^{(k)})$ obtained from the above minimization as $$\Delta C_{p,q,r,opt}^{k+1} \triangleq \Delta C_{p,q,r}^{k+1}(\lambda_{p,opt}^{(k)}, \lambda_{q,opt}^{(k)}, \lambda_{r,opt}^{(k)}). \quad (49)$$

The computational complexity in this brute-force method is $O(M^3)$ for M-PAM and $O(M^{1.5})$ for M-QAM. As in the case of 2-symbol update, we can obtain an approximate low-complexity solution to (48) as follows. We define $F_{p,q,r} \in \mathbb{R}^{3 \times 3}$ as the 3×3 submatrix of G containing only the elements in the pth, qth and rth rows and columns, and $$z_{p,q,r}^{(k)} \triangleq [z_p^{(k)} z_q^{(k)} z_r^{(k)}]^T.$$

With these definitions, we can write $$\hat{\Lambda}_{p,q,r}^{(k)} \triangleq [\hat{\lambda}_p^{(k)} \hat{\lambda}_q^{(k)} \hat{\lambda}_r^{(k)}]^T = 2\lfloor 0.5 F_{p,q,r}^{-1} z_{p,q,r}^{(k)} \rfloor \quad (50)$$

We carry out adjustments on $\hat{\lambda}_p^{(k)}, \hat{\lambda}_q^{(k)}, \hat{\lambda}_r^{(k)}$ (similar to those in (29)), and obtain the solutions for (48) using the brute-force and the approximate methods, respectively, as $$(u, v, w) = \arg\min_{(p, q, r)} \Delta C_{p,q,r,opt}^{k+1}. \quad (51)$$

And $$(\hat{u}, \hat{v}, \hat{w}) = \arg\min_{(p, q, r)} \Delta C_{p,q,r}^{k+1}(\hat{\lambda}_p^{(k)}, \hat{\lambda}_q^{(k)}, \hat{\lambda}_r^{(k)}). \quad (52)$$

The corresponding minimum values of the cost difference functions are given by $$\Delta C_{opt}^{k+1} \triangleq \Delta C_{u,v,w,opt}^{k+1}, \quad (53)$$

And $$\Delta \hat{C}_{opt}^{k+1} \triangleq \Delta C_{\hat{u},\hat{v},\hat{w}}^{k+1}(\hat{\lambda}_{\hat{u}}^{(k)}, \hat{\lambda}_{\hat{v}}^{(k)}, \hat{\lambda}_{\hat{w}}^{(k)}). \quad (54)$$

The update rule for the $Z^{(k)}$ vector is given by $$z^{(k+1)} = z^{(k)} - G(d^{(k+1)} - d^{(k)}) \quad (55)$$
$$= z^{(k)} - (\lambda_{u,opt}^{(k)} g_u + \lambda_{v,opt}^{(k)} g_v + \lambda_{w,opt}^{(k)} g_w)$$

for the brute-force method, and $$z^{(k+1)} = z^{(k)} - (\hat{\lambda}_{\hat{u}}^{(k)} g_{\hat{u}} + \hat{\lambda}_{\hat{v}}^{(k)} g_{\hat{v}} + \hat{\lambda}_{\hat{w}}^{(k)} g_{\hat{w}}) \quad (56)$$

for the approximate method.

APPENDIX B

Complexity of the M-LAS Algorithm

In this appendix, we present the complexity of the proposed M-LAS algorithm listed in Table-I. Step 1 is the initialization step, which involves the computation of the initial filter B, the matrix G and the initial data vector $d^{(0)}$. If the initial filter is MMSE or ZF, then the computational complexity of the initialization step is $O(N_t^2 N_r)$.

Steps 2 to 48 represent one search stage of the proposed algorithm. The algorithm goes through a sequence of such search stages until it terminates in Step 49. In each search stage, the algorithm first undergoes multiple iterations of 1-symbol updates till it reaches a 1 symbol update local minima, which is carried out in Step 4 to Step 18 of the algorithm. The computational complexity of one iteration (i.e., from Step 6 to Step 18) is $O(N_t)$. The number of these iterations is a random variable, and the mean number of iterations per search stage, evaluated through simulations, has been found to be proportional to Nt; the proportionality constant depends on M, the signal set (PAM/QAM), average received SNR, and the initial vector (this can be observed from FIG. 11 for MMSE initial filter and 4-QAM). Therefore, in each search stage, the computational complexity from Step 2 to Step 19 is $O(N_t^2)$. Upon reaching a 1-symbol update local minima (in Step 15), the algorithm jumps to Step 19 and starts a 2-symbol update.

Steps 20 to 33 represent the 2-symbol update. In Steps 22 and 23, we employ the approximate method (instead of the brute-force method in order to reduce complexity) for the minimization of Eqn. (26) for each (p, q) pair. In Step 28, the algorithm checks to see if it has been able to find a pair of symbols, such that updating the pair would result in a decrease in the ML cost function. If the check passes, then the z and d vectors are appropriately updated in Steps 29 and 30, respectively. The initial vectors d(0) and z(0) for the next search stage are properly initialized (Step 31) and the control is transferred back to Step 2, from where the next search stage would start. It can be seen that the computational complexity of the 2-symbol update (Step 20 to 34 using the approximate method) is O ($N^2_t$). If the brute-force technique were to be used, then the complexity would be O ($M^2N^2_t$) for M-PAM and O(M $N^2_t$) for square M-QAM. If the check in Step 28 fails, it implies that the algorithm could not find a 2-symbol update which would result in a decrease in the ML cost function. Therefore, the algorithm jumps to Step 34, and starts a 3-symbol update.

Steps 35 to 48 represent the 3-symbol update. It can be seen that the computational complexity of the 3-symbol update (Steps 35 to 48) is O ($N^3_t$) for the approximate method. If the brute-force technique were to be used, then the complexity would be O($M^3$ $N^3_t$) for M-PAM and O($M^{1.5}$ $N^3_t$) for square M-QAM. We note that the algorithm tries a 3-symbol update only when any 2-symbol update does not lead to a decrease in the cost function. Therefore, if the check in Step 43 fails and we terminate, it is an indication that with the current data vector no 1-, 2- or 3-update would lead to a decrease in the cost function. This, therefore, guarantees that indeed the final detected output vector belongs to the set M3.

Combining the complexities involved with the various steps discussed in the above, it can be seen that the complexity of one search stage of the algorithm is upper bounded by O ($N^3_t$). The total complexity would depend upon the number of stages till the algorithm terminates. Through simulations, it has been observed that the mean number of search stages is almost constant (this can be observed in FIG. 12 for MMSE initial filter and 4-QAM). Therefore, the total computational complexity of the proposed algorithm is O($N^2_t$ $N_r$), i.e., an average per-symbol complexity of O($N_tN_r$). It can be seen that the proposed algorithm can be easily extended such that the algorithm does not terminate after 3-symbol update, i.e., a general K-symbol update algorithm can be devised. A large K can offer better performance at the cost of increased complexity of O($N^K_t$). However, as we will show in the simulation results, even with K=3 (i.e., up to 3-symbol update) the proposed algorithm is able to achieve near-ML performance in a system with tens of antennas.

The present invention achieves both complexity gain as well as performance gain compared to a well known MIMO detector in prior art (i.e., ZF-SIC) when the number of antennas is more than 20. When the number of antennas is less than 20, the present invention achieves only complexity gain compared to ZF-SIC detector.

The present invention achieves near-ML performance only for large number of antennas. Typically, near-ML performance is achieved for more than 60 antennas.

Placement of tens to hundreds of antennas in communication terminals is a challenge when the communication terminals are small in size. This would require a high carrier frequency operation, i.e., small carrier wavelengths for λ/2 separation to ensure independence between multi-antennas fade coefficients. Communication terminals of reasonable size (e.g., laptops, set top box, etc.) can have tens of antennas (e.g., 32 or 64 antennas) using which the present invention can achieve near-ML performance. Fixed communication terminals in indoor environments can have even higher number of antennas. Also, a much larger number of antennas can be embedded in the body of vehicles in moving platform applications (e.g., cars, trucks, tanks, jeeps, autonomous under water vehicles in under water acoustic communications, etc.).

Since a high-rate space-time block code (STBC) multi-antenna approach typically involves lesser number of antennas compared to a V-BLAST multi-antenna approach, the antenna placement issue can be alleviated by the use of high-rate STBC approach. Accurate channel estimation at the receiver is a requirement in the proposed invention.

Other Applications of the Present Invention

In addition to being applicable to the V-BLAST multi-antenna systems and STBC multi-antenna systems, the present invention is also applicable to the following large MIMO systems:

Distributed MIMO systems and networks with large number of cooperating nodes.

Ultra-wide band (UWB) systems with large number of users and large number of channel taps (caused by frequency selectivity of the channel).

Multiuser OFDM and MIMO-OFDM systems with large number of users and large number of subcarriers.

Underwater acoustic communications with large number of sensor/communication nodes deployed to sense and send information through the underwater acoustic channel to a data collection platform provided with multiple receive antennas.

Our results further show that providing asymmetry in number of antennas such that $N_r > N_t$ keeping the total receiver array length same as that for $N_r = N_t$, the detector is able to pick up the extra receive diversity thereby significantly improving the BER performance.

Asymmetry in Number of Antennas with $N_r > N_t$. FIG. 14 illustrates that the LAS detector can achieve substantial improvement in uncoded as well as coded BER performance compared to $N_r = N_t$ by increasing $N_r$ beyond $N_t$ for 16-QAM in i.i.d. fading. For example, by comparing the LAS detector performance in decoding 12×12 STBC from DA with ($N_t = N_r = 12$) versus ($N_t = 12$, $N_r = 18$) we observe that the uncoded BER performance with ($N_t = 12, N_r = 18$) improves by about 14 dB compared to ($N_t = N_r = 12$) at 10-3 BER. Even the uncoded BER performance with ($N_t = 12$, $N_r = 18$) is significantly better than the coded BER performance with ($N_t = N_r = 12$). This improvement is essentially due to the ability of the LAS detector in effectively picking up the additional diversity orders provided by the increased number of receive antennas. With a rate-¾ turbo code (36 bps/Hz spectral efficiency), at a coded BER of 10-4, the LAS detector achieves a significant performance improvement of about 12.5 dB with ($N_t = 12$, $N_r = 18$) compared to that with (Nt=Nr=12). In fact, with ($N_t = 12$, $N_r = 18$) the vertical fall of coded BER is such that it is only about 7 dB from the theoretical minimum SNR to achieve capacity. A similar advantage of exploiting antenna asymmetry with $N_r > N_t$ and 16-QAM in correlated fading is illustrated in FIG. 15, where we have maintained $N_r d_r = 72$ cm and $d_t = d_r$ in both the cases of symmetry (i.e., $N_t = N_r = 12$) as well as asymmetry (i.e., $N_t = 12, N_r = 18$). From FIG. 15, it can be observed that with asymmetry and rate-¾ turbo code (i.e., 36 bps/Hz), the LAS detector achieves near-capacity performance to within just about 8 dB, which is a significant result which points to the potential of realizing practical high spectral efficiency multi-gigabit large MIMO systems that can achieve near-capacity performance even in the presence of spatial correlations.

While the spectral efficiencies achieved in current MIMO wireless standards (e.g., IEEE 802.11n and 802.16e) are only about 10 bps/Hz or less, the practical feasibility of the proposed LAS detector and its ability to perform well at much higher spectral efficiencies through the use of 16×16 and 12×12 non-orthogonal STBCs can enable practical implementation of multi-gigabit MIMO wireless systems with spectral efficiencies in excess of 10 bps/Hz. This approach can also be relevant in multi-gigabit 60 GHz WPAN/VHT systems under NLOS conditions; the advantages being higher spectral efficiencies and robustness to blockages (e.g., obstruction due to moving persons/objects) in indoor environments.

Decoding and BER of Perfect Codes of Large Dimensions

The perfect codes under ML decoding can provide coding gain in addition to ILL and FD. Decoding of perfect codes has been reported in the literature for only up to 5 antennas using sphere/lattice decoding as in reference [21]. The complexity of these decoders are prohibitive for decoding large sized perfect codes, although large sized codes are of interest from a high spectral efficiency view point. Further, because of its low complexity attribute, the proposed M-LAS detector is able to decode perfect codes of large dimensions. FIGS. 16 and 17, shows the simulated BER performance of perfect codes in comparison with those of ILL-only and FD-ILL STBCs for up to 32 transmit antennas using 1-LAS detector.

FIG. 16, shows uncoded BER comparison between perfect codes and ILL-only STBCs for different $N_t=N_r$ and 4-QAM using 1-LAS detection. From FIG. 16, it can be seen that the 1-LAS detector achieves better performance for ILL-only STBCs than for perfect codes, when codes with small number of transmit antennas are considered (e.g., $N_t=4, 6, 8$). While perfect codes are expected to perform better than ILL-only codes under ML detection for any $N_t$, it is observed that the opposite behavior under 1-LAS detection for small $N_t$ (i.e., performance for ILL only STBCs being better than that for perfect codes for small dimensions). This behavior could be attributed to the nature of the LAS detector, which achieves near-optimum performance only when the number of dimensions is large, and it appears that, in the detection process, LAS is able to more effectively disentangle the symbols in STBCs when $\delta=t=1$ (i.e., in ILL-only STBCs) than in perfect codes. The performance gap between perfect codes and ILL-only STBCs with 1-LAS detection diminishes for increasing code sizes such that the performance for 32×32 perfect code and ILL-only STBC with 4-QAM are almost same and close to the SISO AWGN performance. In FIG. 17, we show a similar comparison between perfect codes, ILL-only and FD-ILL only STBCs when larger modulation alphabet sizes (e.g., 16-QAM) are used in the case of 16×16 and 32×32 codes. It can be seen that with higher order QAM like 16-QAM, perfect codes with 1-LAS detection perform poorer than ILL-only and FD-ILL STBCs, and that ILL-only and FD-ILL STBCs perform almost same and close to the SISO AWGN performance. The results in FIGS. 16 and 17 suggest that, with LAS detection, owing to the simplicity and good performance in using $\delta=t=1$, ILL-only STBCs can be a good choice for practical large STBC MIMO systems.

Iterative Detection/Channel Estimation

The perfect CSIR assumption and estimate the channel matrix based on a training based iterative detection/channel estimation scheme is disclosed. In order to train the channel, a known training matrix $X_c^{(P)} \in C^{N_t \times N_t}$ (referred to as the pilot matrix) is transmitted. The pilot matrix is followed by $N_d$ data STBC matrices $X_c^{(i)} \in C^{N_t \times N_t}$, $i=1, 2, \ldots, N_d$. Consequently, a block of transmitted pilot and data matrices is of dimension $N_t \times N_t(1+N_d)$, and can be written as $$X_c[X_c^{(P)} X_c^{(1)} X_c^{(2)} \ldots X_c^{(N_c)}]. \tag{57}$$

Let the transmit power be allotted to the pilot phase and data transmission phase in a block in the ratio $$\frac{\beta_p}{\beta_d}$$

such that $$\frac{\beta_p + N_d \beta_d}{N_d} = 1.$$

We impose a power constraint on the pilot matrix such that $$tr(X_c^{(P)} X_c^{(P)H}) = \frac{N_t^2 E_2 \beta_p}{\beta_d} = \mu N_t.$$

where $$\mu \triangleq \frac{N_t E_2 \beta_p}{\beta_d}$$

and Es is the average energy of the transmitted symbol. The pilot matrix should be such that $X_c^{(P)} X_c^{(P)H} = \mu I N_t$ [26]. Let $H_c \in C^{Nr \times Nt}$ denote the channel matrix, which we want to estimate. We assume block fading, where the channel gains remain constant over one block consisting of $(1+N_d)N_t$ channel uses, which can be viewed as the channel coherence time. This assumption can be valid in slow fading scenarios like BS-to-BS backbone connectivity and BS-to-CPE wireless IPTV distribution applications mentioned before. For this training based system and channel model, Hassibi and Hochwald have presented a lower bound on the capacity in [26]; we will illustrate the nearness of the performance achieved by the proposed iterative detection/estimation scheme to this bound. The received block is of dimension Nr×Nt(1+Nd), and can be expressed as $$y_c = [Y_c^{(P)} Y_c^{(1)} Y_c^{(2)} \ldots Y_c^{(N_c)}] = H_c X_c + N_c, \tag{58}$$

where $N_c = [N_c^{(P)} N_c^{(1)} N_c^{(2)} \ldots N_c^{(N_d)}]$ is the $N_r' N_t (1+N_d)$ noise matrix and its entries are modeled as i.i.d.

$$CN\left(0, \sigma^2 = \frac{N_t E_2}{\lambda \beta_c}\right).$$

where γ is the average SNR per receive antenna.

Equation (58) can be decomposed into two parts, namely, the pilot transmission part and the data transmission part, as $$Y_c^{(P)} = H_c X_c^{(P)} + N_c^{(P)}, \tag{59}$$

and $$Y_c^{(D)} = [Y_c^{(1)} Y_c^{(2)} \ldots Y_c^{(N_d)}] \tag{60}$$
$$= H_c [X_c^{(1)} X_c^{(2)} \ldots X_c^{(N_d)}] + [N_c^{(1)} N_c^{(2)} \ldots N_c^{(N_d)}]$$

MMSE Estimation Scheme

One method to detect the transmitted symbols with estimated channel coefficients is as follows:

1) Estimate the channel gains via an MMSE estimator from the signal received during the first Nt channel uses (i.e., during pilot transmission); i.e., given Y(P)c and X(P)c, an estimate of the channel matrix $H_c$ is found as $$H_c^{est} = \sqrt{\mu} Y_c^{(P)} (X_c^{(P)})^H [\sigma^2 I_{N_t} + \mu X_c^{(P)} (X_c^{(P)})^H]^{-1}. \quad (61)$$

2) Use the above $H_c^{est}$ in place of Hc in the M-LAS algorithm and detect the transmitted data symbols.

We refer to the above scheme as the 'MMSE estimation scheme.' In the absence of the knowledge of $\sigma^2$, a zero-forcing estimate can be obtained at the cost of some performance loss compared to the MMSE estimate. The performance of the estimator can be improved by using a cyclic minimization technique for minimizing the ML metric [22].

Proposed Iterative Detection/Estimation Scheme

The proposed 'iterative detection/estimation scheme' works as follows:

1) Obtain an initial estimate of the channel using the MMSE estimator in (61).
2) Using the channel estimate, detect the data STBC matrices $X_c^{(i)}$, i=1, 2, . . . , Nd using the M-LAS detector. Substituting these detected STBC matrices into (57), form $X_c^{est}$.
3) Re-estimate the channel using $X_c^{est}$ from the previous step, via $$H_c^{est} = Y_C (X_c^{(est)})^H [\sigma_2 I_{N_t} + \mu X_c^{est} (X_c^{est})_H]^{-1}. \quad (62)$$

4) Iterate steps 2 and 3 until convergence or for a specified number of iterations.

It can be seen that the complexity of obtaining the initial estimator (i.e., MMSE estimator) is $O(Nt^2)$ per symbol, and each estimation/detection iteration includes one M-LAS detection operation. Since the number of iterations is typically small (our simulations showed that the performance gain saturates beyond 4 iterations), the overall complexity order remains same as that of the M-LAS algorithm.

BER Performance with Estimated CSIR

We evaluated the BER performance of the M-LAS detector using estimated CSIR, where we estimate the channel gain matrix through the training based estimation schemes described in the above subsections. We consider the BER performance under three scenarios, namely, i) under perfect CSIR, ii) under CSIR estimated using the MMSE estimation scheme, and iii) under CSIR estimated using the iterative detection/estimation scheme. In the case of estimated CSIR, we show plots for 1P+1D and 1P+8D training, where by 1P+nD training we mean a training scheme with a block of size 1+n matrices, with 1 pilot matrix followed n data STBC matrices. For this 1P+nD training scheme, a lower bound on the capacity is given by [21]

$$C \geq \frac{T-\tau}{T} E\left[\log\det\left(I_{N_t} + \frac{\beta_d \beta_p \tau}{N_t(1+\beta_d) + \beta_p \tau} \frac{\hat{H}_c \hat{H}_c^H}{N_c \sigma_{\hat{H}_c}^2}\right)\right], \quad (63)$$

where T and τ, respectively, are the block size (i.e., channel coherence time) and pilot duration in number of channel uses, and $$\sigma_{\hat{H}_c}^2 = \frac{1}{N_t N_r} E[\{\hat{H}_c \hat{H}_c^H\}]$$

where $\hat{H}_c = E[H_c | X_c^{(P)} Y_c^{(P)}]$ is the MMSE estimate of the channel gain matrix. We computed the capacity bound in (63) through simulations for 1P+8D and 1P+1D training for a 16×16 MIMO channel. For 1P+8D training T=(1+8)16=144, τ=16, and for 1P+1D training T=(1+1)16=32, τ=16. Also, in computing the bounds (shown in FIG. 19) and in BER simulations (in FIGS. 20 and 21), we have used the following pilot and data power allocation: for 1P+8D training $$\beta_p = \frac{1}{2},$$

$$\beta_p = 1 - \frac{\beta_p}{N_d} = 1 - \frac{1}{16} = \frac{16}{16}, \left(\beta_p = \beta_d = \frac{1}{2}\right).$$

We note that improved capacity and BER performance can be achieved if the optimum power allocation derived in [21] is used instead of the above power allocation. In FIG. 19, we plot the computed capacity bounds, along with the capacity under perfect CSIR. We obtain the minimum SNR for a given capacity bound in (63) from the plots in FIG. 19, and show (later in FIG. 21) the nearness of the coded BER performance of the proposed scheme to this SNR limit.

In all the BER simulations with training, $I_{N_t}$ is used as the pilot matrix. In FIG. 20, we plot the uncoded BER performance of 1-LAS detector when 1P+1D and 1P+8D training are used for channel estimation in a 16×16 ILL-only STBC MIMO system with Nt=Nr=16 and 4-QAM. BER performance with perfect CSIR is also plotted for comparison. From FIG. 20, it can be observed that, as expected, the BER degrades with estimated CSIR compared to that with perfect CSIR. For example, with 1P+1D training, both the MMSE estimation scheme as well as the iterative detection/estimation scheme (with 4 iterations between estimation and detection) perform almost the same, which is about 5 dB worse compared to that of perfect CSIR at an uncoded BER of $10^{-3}$. This indicates that with 1P+nD training, iteration between detection and estimation does not improve performance much over the non-iterative scheme (i.e., the MMSE estimation scheme) for small n. With large n (e.g., slow fading), however, the iterative scheme outperforms the non-iterative scheme; e.g., with 1P+8D training, the performance of the MMSE estimation scheme improves by about 1 dB compared to 1P+1D training at $10^{-3}$ BER, whereas the improvement is about 2 dB for the iterative detection/estimation scheme.

In FIG. 21, we present the turbo coded BER of 1-LAS detector using estimated CSIR for the cases of 1P+8D and 1P+1D training. Simulations were done with rate-¾, ½ and ⅓ turbo codes, and the results for rate-¾ code are shown in FIG. 21. From FIG. 21, it can be seen that, compared to that of perfect CSIR, the estimated CSIR performance is worse by about 4.5 dB in terms of coded BER for 1P+8D training. Also, the vertical fall in coded BER occurs at about 4.2 dB away from the capacity bound for 1P+1D and 1P+8D training with MMSE estimation scheme. This nearness to capacity bound improves by about 0.5 dB for the iterative detection/estimation scheme. Finally, we note that for the system in FIG. 21 with parameters 16×16 ILL-only STBC, 4-QAM, rate-¾ turbo code, and 1P+8D training with T=144, τ=16, we achieve a high spectral efficiency of $$16 \times 2 \times \frac{3}{4} \times \frac{8}{9} = 21.3 \text{ bps/HZ}$$

even after accounting for the overheads involved in channel estimation (i.e., pilot matrix) and channel coding, while achieving good near-capacity performance at low complexity. This points to the suitability of the proposed approach of using M-LAS detection along with iterative detection/estimation in practical implementation of large STBC MIMO systems.

TABLE I

Proposed M-LAS Algorithm

1: $d^{(0)} = By; z(0) = H^T(y - H_d(0)); G = H^T H$
2: k = 0; k is the iteration number; a search stage starts here
3: nsymb = $2N_t$; nsymb is $2N_t$ for QAM and $N_t$ for PAM
4: (1-symbol update starts here)
5: for p = 1 to nsymb 6:
$$a_p = (G)_{p,p}, \, l_p^{(k)} = 2\left\lceil \frac{|z_p^{(k)}|}{2a_{(p)}} \right\rceil$$

7: if $(l_p^{(k)} \neq 0)$
8: $\tilde{d}_p^{(k+1)} = d_p^{(k)} + l_p^{(k)} \text{sgn}(z_p^{(k)})$
9: if $(\tilde{d}_p^{(k+1)} > M - 1) l_p^{(k)} = l_p^{(k)} - \text{sgn}(z_p^{(k)})(\tilde{d}_p^{(k+1)} - M + 1)$
10: if $(\tilde{d}_p^{(k+1)} < - M + 1) l_p^{(k)} = l_p^{(k)} - \text{sgn}(z_p^{(k)})(\tilde{d}_p^{(k+1)} + M - 1)$
11: end; (end of if statement in step 7)
12: $\Delta C_p^{(k+1)} = l_p^{(k)^2} a_p - 2 l_p^{(k)} |z_p^{(k)}|$
13: end; (end of if statement in step 4)
14: s = arg $\min_p \Delta C_p^{(k+1)}, \eta^k = \max_p l_p^{(k)}$
15: if $(\eta^{(k)} = 0)$ goto Step19; (1-symbol update local minima reached here)
16: $d^{(k+1)} = d^{(k)} + l_s^{(k)} \text{sgn}(z_s^{(k)}) e_s$
17: $z^{(k+1)} = z^{(k)} - l_s^{(k)} \text{sgn}(z_s^{(k)}) g_s$; ($g_s$ is sth column of G)
18: k = k + 1, goto Step 5
19: (2-symbol update starts here)
20: for p = 1 to nsymb, q = p + 1 to nsymb
21: $F_{p,q} = [G]_{p,q}, Z_{p,q}^{(k)} = [z_p^{(k)} z_q^{(k)}]^T$ 22:
$$\hat{\Lambda}_{p,q}^{(k)} \triangleq \left(\hat{\lambda}_p^{(k)} \hat{\lambda}_q^{(k)}\right)^T = 2\lceil 0.5 F_{p,q}^{-1} z_{p,q}^{(k)} \rceil$$

23: Adjust $\hat{\lambda}_p^{(k)}, \hat{\lambda}_q^{(k)}$ using Eqn. (29)
24: $\Delta \hat{C}_{p,q}^{k+1}(\hat{\Lambda}_{p,q}^{(k)}) = \hat{\Lambda}_{p,q}^{(k)^T} F_{p,q} \hat{\Lambda}_{p,q}^{(k)} - 2 \hat{\Lambda}_{p,q}^{(k)^T} z_{p,q}^{(k)}$
25: end; (end of if statement in step 20)

26:
$$(\hat{u}, \hat{v}) = \underset{(p, q)}{\text{argmin}} \, \Delta C_{p,q}^{k+1}(\hat{\Lambda}_{p,q}^{(k)})$$

27: $\Delta \hat{C}_{opt}^{k+1} = \Delta C_{u,v}^{k+1}(\Lambda_{u,v}^{(k)})$
28: if $(\Delta \hat{C}_{opt}^{k+1} < 0)$
29: $z^{(k+1)} = z^{(k)} - (\hat{\lambda}_{\hat{u}}^{(k)} g_{\hat{u}} + \hat{\lambda}_{\hat{v}}^{(k)} g_{\hat{v}})$
30: $d^{(k+1)} = d^{(k)} + \hat{\lambda}_{\hat{u}}^{(k)} e_{\hat{u}} + \hat{\lambda}_{\hat{v}}^{(k)} e_{\hat{v}}$
31: $d^{(0)} + d^{(k+1)}, z^{(0)} + z^{(k+1)}$
32: goto Step 2
33: end; (end of if statement in step 28)
34: (3-symbol update starts here)
35: for p = 1 to nsymb, q = p + 1 to nsymb, r = q + 1 to nsymb
36: $F_{p,q,r} = [G]_{p,q,r}, Z_{p,q,r}^{(k)} = [z_p^{(k)} z_q^{(k)} z_r^{(k)}]^T$ 37:
$$\hat{\Lambda}_{p,q,r}^{(k)} \triangleq \left(\hat{\lambda}_p^{(k)} \hat{\lambda}_q^{(k)} \hat{\lambda}_r^{(k)}\right)^T = 2\lceil 0.5 F_{p,q,r}^{-1} z_{p,q,r}^{(k)} \rceil$$

38: Adjust $\hat{\lambda}_p^{(k)}, \hat{\lambda}_q^{(k)}, \hat{\lambda}_r^{(k)}$ using Eqn. (29)
39: $\Delta C_{p,q,r}^{k+1}(\hat{\Lambda}_{p,q,r}^{(k)}) = \hat{\Lambda}_{p,q,r}^{(k)^T} F_{p,q,r} \hat{\Lambda}_{p,q,r}^{(k)} - 2 \hat{\Lambda}_{p,q,r}^{(k)^T} z_{p,q,r}^{(k)}$
40: end; (end of loop starting at line 35)

41:
$$(\hat{u}, \hat{v}, \hat{w}) = \underset{(p, q, r)}{\text{argmin}} \, \Delta C_{p,q,r}^{k+1}(\hat{\Lambda}_{p,q,r}^{(k)})$$

42: $\Delta \hat{C}_{opt}^{k+1} = \Delta C_{\hat{u},\hat{v},\hat{w}}^{k+1}(\hat{\Lambda}_{\hat{u},\hat{v},\hat{w}}^{(k)})$
43: if $(\Delta \hat{C}_{opt}^{k+1} < 0)$
44: $z^{(k+1)} = z^{(k)} - (\hat{\lambda}_{\hat{u}}^{(k)} g_{\hat{u}} + \hat{\lambda}_{\hat{v}}^{(k)} g_{\hat{v}} + \hat{\lambda}_{\hat{w}}^{(k)} g_{\hat{w}})$
45: $d^{(k+1)} = d^{(k)} + \hat{\lambda}_{\hat{u}}^{(k)} e_{\hat{u}} + \hat{\lambda}_{\hat{v}}^{(k)} e_{\hat{v}} + \hat{\lambda}_{\hat{w}}^{(k)} e_{\hat{w}}$
46: $d^{(0)} = d^{(k+1)}, z^{(0)} = z^{(k+1)}$
47: goto Step 2
48: end; (end of if statement in step 43)
49: Terminate Algorithm; $d^{(k)}$ is the detected output vector Iterative Channel Estimation/Detection A training based iterative LAS detection/channel estimation scheme and its BER performance is presented below.

Training-Based Channel Estimation

In the considered training-based channel estimation scheme, transmission is carried out in frames, where one $N_t \times N_t$ pilot matrix (for training purposes) followed by $N_d$ data STBC matrices are sent in each frame as shown in FIG. 22. One frame length, T, (taken to be the channel coherence time) is $T=(N_d+1)N_t$ channel uses.

A frame of transmitted pilot and data matrices is of dimension $N_t \times N_t(1+N_d)$, which can be written as $$X_c = [X_c^{(P)} X_c^{(1)} X_c^{(2)} \ldots X_c^{(N_d)}] \quad (64)$$

As in reference [21], let $\gamma_p$ and $\gamma_d$ denote the average SNR during pilot and data phases, respectively, which are related to the average received SNR $\gamma$ as $\gamma(N_d+1)=\gamma_p+N_d\gamma_d$.

Define $$\beta_p \triangleq \frac{\gamma_p}{\gamma},$$

and $$\beta_d \triangleq \frac{\gamma_d}{\gamma}.$$

Let $E_s$ denote the average energy of the transmitted symbol during the data phase. The average received signal power during the data phase is given by $E[tr(X_c^{(i)} X_c^{(i)H})]=N_t^2 E_s$, and the average received signal power during the pilot phase is $$E\left[tr\left(X_c^{(P)} X_c^{(P)H}\right)\right] = \frac{N_t^2 E_s \beta_p}{\beta_d} = \mu N_t,$$

where $$\mu \triangleq \frac{N_t E_s \beta_p}{\beta_d}.$$

For optimal training, the pilot matrix should be such that $X_c^{(P)} X_c^{(P)H} = \mu I_{N_t}$ reference [21]. Let $H_c \in X^{N_r \times N_t}$ denote the channel matrix, which we want to estimate. We assume block fading, where the channel gains remain constant over one block consisting of $(1+N_d)N_t$ channel uses, which can be viewed as the channel coherence time. This assumption can be valid in slow fading fixed wireless applications (e.g., as in possible applications like BS-to-BS backbone connectivity and BS-to-CPE wireless IPTV distribution). For this training-based system and channel model, Hassibi and Hochwald presented a lower bound on the capacity in reference [21]; we will illustrate the nearness of the performance achieved by the iterative detection/estimation scheme to this bound. The received block is of dimension $N_r \times N_t(1+N_d)$, and can be written as $$Y_c = [Y_c^{(P)} Y_c^{(1)} Y_c^{(2)} \ldots Y_c^{(N_c)}] = H_c X_c + N_c, \quad (65)$$

where $N_c=[N_c^{(P)} N_c^{(1)} N_c^{(2)} \ldots N_c^{(N_d)}]$ is the $N_r \times N_t(1+N_d)$ noise matrix and its entries are modeled as i.i.d.

$$XN\left(0, \sigma^2 = \frac{N_t E_s}{\gamma \beta_d}\right).$$

Equation (65) can be decomposed into two parts, namely, the pilot matrix part and the data matrices part, as $$Y_c^{(P)} = H_c X_c^{(P)} + N_c^{(P)}, \quad (66)$$

$$Y_c^{(D)} = [Y_c^{(1)} Y_c^{(2)} \ldots Y_c^{(N_d)}] = H_c [X_c^{(1)} X_c^{(2)} \ldots X_c^{(N_d)}] + [N_c^{(1)} N_c^{(2)} \ldots N_c^{(N_d)}]. \quad (67)$$

We claim:

1. A method to detect data transmitted by multiple antennas, said method comprising acts of:
   a) selecting a starting data block wherein the starting data block is either a random data block or an output data block from known detectors,
   b) changing each symbol of the starting data block one symbol at a time to identify a data block which has minimum euclidean distance from the starting data block as detected data block,
   c) changing two symbols of the detected data block at a time to identify a data block which has minimum euclidean distance from the starting data block as second data block,
   d) assigning the second data block as the starting data block and repeating said steps 'b' and 'c', if the minimum euclidean distance of second data block is better than that of the detected data block, and
   e) determining the detected data block as the data transmitted.

2. The method as claimed in claim 1 further comprises changing three symbols of the detected data block at a time to identify a data block which has minimum euclidean distance from the starting data block as third data block.

3. The method as claimed in claim 1 or 2 further comprises assigning the third data block as the starting data block and repeating said steps 'b' to 'e', if the minimum euclidean distance of the third data block is better than that of the detected data block and determining the detected data block as the data transmitted.

4. The method as claimed in claim 1 further comprises defining a set of indices of symbols to be checked for possible change in the steps 'b', 'c'.

5. The method as claimed in claim 1, wherein the method provides for generating soft decision outputs for individual bits to be fed as input to forward error correction decoder.

6. The method as claimed in claim 1, wherein providing a pilot block prior to the data blocks for channel estimation.

7. The method as claimed in claim 6, wherein the channel estimation determines channel gains to detect the starting data block.

8. The method as claimed in claim 1, wherein the channel estimation determines channel gains to detect the starting data block.

9. The method as claimed in claim 8, wherein re-estimating the channel gains using the detected data block.

10. The method as claimed in claim 1, wherein re-estimating the channel gains using the detected data block.

11. The method as claimed in claim 10, wherein the channel gains re-estimation is for a predetermined number of iterations or for a certain number of iterations based on the out come of convergence test.

12. The method as claimed in claim 1, wherein the method uses brute-force or approximate method to compute cost difference.

13. The method as claimed in claim 1, wherein the method comprises data transmissions using a modulation format selected from a group comprising M-ary Quadrature Amplitude Modulation (M-QAM) and M-ary Pulse Amplitude Modulation (M-PAM).

14. The method as claimed in claim 1, wherein the method detects data symbols transmitted from the multiple transmit antennas using MIMO technique selected from a group comprising Space-Time Block Coding (STBC) and V-BLAST.

15. The method as claimed in claim 1, wherein the known detector is selected from a group comprising of matched filter, zero-forcing filter and Minimum Mean-Squared Error (MMSE) filter.

16. The method as claimed in claim 1, wherein the method detects data symbols transmitted from the multiple transmit antennas wherein number of transmit antennas is less than number of receiving antennas.

17. The method as claimed in claim 1, wherein the method provides for detection in multi-user OFDM/OFDMA and MIMO-OFDM systems with multiple sub carriers.

18. The method as claimed in claim 1, wherein the method provides for detection in Ultra-wide band (UWB) systems or impulse radio systems with multiple users and multiple channel taps.

19. The method as claimed in claim 1, wherein the method provides for detection in underwater acoustic communications with multiple nodes deployed to sense and send information.

20. A MIMO system using method as claimed in claim 1.

* * * * *